United States Patent
Gonzalez Macias et al.

(10) Patent No.: US 11,640,387 B2
(45) Date of Patent: May 2, 2023

(54) ANOMALY DETECTION DATA WORKFLOW FOR TIME SERIES DATA

(71) Applicant: Capital One Services, LLC, McLean, VA (US)

(72) Inventors: Vannia Gonzalez Macias, McLean, VA (US); Scott Garcia, McLean, VA (US); Peter Terrana, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/238,536

(22) Filed: Apr. 23, 2021

(65) Prior Publication Data

US 2022/0342868 A1   Oct. 27, 2022

(51) Int. Cl.
  *G06F 16/23*   (2019.01)
  *G06F 7/08*    (2006.01)

(52) U.S. Cl.
  CPC ............ *G06F 16/2365* (2019.01); *G06F 7/08* (2013.01)

(58) Field of Classification Search
  None
  See application file for complete search history.

(56) References Cited

U.S. PATENT DOCUMENTS

| | | | |
|---|---|---|---|
| 10,673,880 B1* | 6/2020 | Pratt | G06F 21/554 |
| 11,294,756 B1* | 4/2022 | Sadrieh | H04L 41/16 |
| 2011/0119374 A1 | 5/2011 | Ruhl et al. | |
| 2014/0032506 A1 | 1/2014 | Hoey et al. | |
| 2015/0269050 A1* | 9/2015 | Filimonov | G06N 20/10 702/183 |
| 2017/0094537 A1* | 3/2017 | Yang | H04L 41/0631 |
| 2018/0314835 A1* | 11/2018 | Dodson | G06F 21/552 |
| 2019/0155672 A1* | 5/2019 | Wang | G06F 11/0709 |
| 2019/0236177 A1* | 8/2019 | Jain | G06F 16/2365 |
| 2020/0073740 A1* | 3/2020 | Ohana | G06F 11/0793 |
| 2020/0097810 A1* | 3/2020 | Hetherington | G06N 3/0454 |
| 2020/0351283 A1* | 11/2020 | Salunke | H04L 63/1425 |
| 2021/0089927 A9* | 3/2021 | Ryan | G06F 11/3006 |
| 2021/0216848 A1* | 7/2021 | Poghosyan | G06N 3/0454 |

(Continued)

OTHER PUBLICATIONS

U.S. Appl. No. 17/239,261, filed Apr. 23, 2021.

(Continued)

*Primary Examiner* — Irene Baker
(74) *Attorney, Agent, or Firm* — Perkins Coie LLP

(57) ABSTRACT

Methods and systems are described herein for improving anomaly detection in timeseries datasets. Different machine learning models may be trained to process specific types of timeseries data efficiently and accurately. Thus, selecting a proper machine learning model for identifying anomalies in a specific set of timeseries data may greatly improve accuracy and efficiency of anomaly detection. Another way to improve anomaly detection is to process a multitude of timeseries datasets for a time period (e.g., 90 days) to detect anomalies from those timeseries datasets and then correlate those detected anomalies by generating an anomaly timeseries dataset and identifying anomalies within the anomaly timeseries dataset. Yet another way to improve anomaly detection is to divide a dataset into multiple datasets based on a type of anomaly detection requested.

20 Claims, 17 Drawing Sheets

(56) References Cited

U.S. PATENT DOCUMENTS

2021/0349897 A1* 11/2021 Pierri ................. G06N 5/04
2021/0406671 A1* 12/2021 Gasthaus ............ G06F 16/2379

OTHER PUBLICATIONS

U.S. Appl. No. 17/238,486, filed Apr. 23, 2021.
U.S. Appl. No. 17/239,143, filed Apr. 23, 2021.
International Search Report and Written Opinion issued in corresponding International Application No. PCT/US2022/025806 dated Aug. 4, 2022 (14 pages).
Yuanxiang Ying et al., "Automated Model Selection for Time-Series Anomaly Detection," arXiv:2009.04395v1 [cs.LG], pp. 1-5, Aug. 2020, https://arxiv.org/abs/2009.04395.
Federico Giannoni et al., "Anomaly Detection Models for IoT Time Series Data," paperswithcode, Nov. 30, 2018, https://paperswithcode.com/paper/anomaly-detection-models-for-iot-time-series, pp. 1-10.
Tsatsral Amarbayasgalan et al., "Unsupervised Anomaly Detection Approach for Time-Series in Multi-Domains Using Deep Reconstruction Error," Symmetry 2020, MDPI, vol. 12, Issue 8, pp. 1-22, Jul. 29, 2020, https://www.mdpi.com/2073-8994/12/8/1251, pp. 1-22.

* cited by examiner

| Time Slot | Number of Security Events |
|---|---|
| 2021-01-01 01:00:00 | 122 |
| 2021-01-01 02:00:00 | 133 |
| 2021-01-01 03:00:00 | 105 |
| 2021-01-01 04:00:00 | 369 |
| ... | ... |
| ... | ... |
| ... | ... |

| Temporal Trait | Anomaly Detection Model |
|---|---|
| Has_Trend | Model 1 |
| Has_Heteroskedasticity | Model 2 |
| Has_Seasonality | Model 3 |
| Has_AppoxConstant | Model 4 |
| ... | ... |
| ... | ... |
| ... | ... |

| Timeseries Signal | Model Execution Parameter |
|---|---|
| Temperature | Parameter 1 |
| Security Log Entries | Parameter 2 |
| Communication Records | Parameter 3 |
| ... | ... |
| ... | ... |
| ... | ... |

FIG. 5

| Dataset 1 | Dataset 2 | Dataset ... |
|---|---|---|
| 2021-01-01 01:00:00 | 2021-01-01 01:00:00 | ... |
| 2021-01-01 04:00:00 | 2021-01-01 09:00:00 | ... |
| 2021-01-01 09:00:00 | | ... |
| 2021-01-01 11:00:00 | | ... |
| ... | ... | ... |
| ... | ... | ... |
| ... | ... | ... |

FIG. 10

| Time Slot | Number of Anomalies |
|---|---|
| 2021-01-01 01:00:00 | 3 |
| 2021-01-01 02:00:00 | 5 |
| 2021-01-01 03:00:00 | 27 |
| 2021-01-01 04:00:00 | 3 |
| ... | ... |
| ... | ... |
| ... | ... |

FIG. 11

| Timestamp | User | System | Action | Field 1 | Field 2 |
|---|---|---|---|---|---|
| 2021-01-01 01:00:00 | User1 | System1 | Access | Value1 | Value1 |
| 2021-01-01 01:01:11 | User2 | System2 | Copy | Value1 | Value1 |
| 2021-01-01 01:01:22 | User1 | System1 | Copy | Value1 | Value1 |
| 2021-01-01 02:00:33 | User1 | System1 | Copy | Value1 | Value1 |
| ... | ... | ... | ... | ... | ... |
| ... | ... | ... | ... | ... | ... |
| ... | ... | ... | ... | ... | ... |

FIG. 14

ANOMALY DETECTION DATA WORKFLOW FOR TIME SERIES DATA

BACKGROUND

Timeseries data processing is used in various industries for identifying patterns and anomalies. For example, in the cybersecurity industry timeseries data may be used to identify anomalies that correspond to security threats or security breaches, which may be vital to many enterprises. In another example, timeseries data is used to determine anomalies in weather patterns. In yet another example, timeseries processing is used by financial institutions to detect fraudulent activity or other activity that is out of the ordinary (e.g., anomalous) and apply targeted defenses. Some anomaly detection scenarios suffer from inaccurate results, for example, cases where many/too many false positive results are detected (e.g., an anomaly has been detected, but no anomaly exists at the detection time). More recently, enterprises started using machine learning to build analysis models and to process timeseries data in order to more efficiently and accurately identify anomalies.

SUMMARY

There are several types of machine learning models that can be trained to process specific types of timeseries data efficiently and accurately. For example, some machine learning models are better suited for timeseries data exhibiting a trend while other machine learning models are better suited for timeseries data exhibiting heteroskedastic attributes. Selecting a proper model for identifying anomalies, or a suitable transformation applied to the data based on the timeseries trait (e.g., trend smoothing) in a specific set of timeseries data may greatly improve accuracy and efficiency of anomaly detection.

Currently, two approaches are used to select a proper model. The first approach is a manual approach where a person explores the timeseries data and determines the best model to use. The second approach is referred to as a brute force approach where the timeseries data is run through every model and a person determines which model has the best results. Both approaches are inefficient and/or lead to inaccurate results. For example, a person exploring timeseries data is both a very time consuming and resource consuming process. In many cases, this is unacceptable because a fast or near real-time response is required to process the data. The brute force method requires a large amount of computing resources and time to run the data through each available model and may result in a poorly selective rule. For example, if twenty different models are available, the time to run the data through each model and the human factor of analyzing the data makes the process unacceptable for many applications (e.g., cybersecurity applications or fraud detection applications).

One application where automatic model selection is especially relevant is providing anomaly detection as a service. For example, an application programming interface may be provided to a user that enables a user to submit a timeseries dataset to an anomaly detection system together with some metadata that may include a timeseries signal value indicating the type of data (e.g., temperature readings) and in response, the anomaly detection system may output back to the user anomalies that have been located within the data.

Methods and systems are described herein for automatically selecting an appropriate model for processing timeseries data. An appropriate model may be selected by a model selection system based on a temporal trait associated with a timeseries dataset. For example, the model selection system may receive a timeseries dataset that includes timestamps and corresponding values. The timeseries dataset may include data representing a frequency of various security events from different computer systems. In another example, the timeseries dataset may be a set of temperatures at various times of the day, week, month, or year in different locations.

The model selection system may determine a temporal trait associated with the timeseries dataset. A temporal trait may identify a pattern within the timeseries dataset, the pattern indicating a trend, heteroscedasticity, seasonality, serial correlation, or an approximate constant. In some embodiments the temporal trait may identify another characteristic of the timeseries dataset. The model selection system may select, based on the temporal trait, an anomaly detection model for detecting anomalies in the timeseries dataset. The model selection system may select a model from a multitude of models such that each model is matched with a corresponding temporal trait. For example, the model selection system may store a table with entries where a particular temporal trait matches a particular model.

When the model selection system selects an appropriate model, the model selection system may adjust one or more model parameters so that the model is enabled to detect anomalies with better accuracy and/or speed. Thus, the model selection system may determine, a timeseries signal associated with the timeseries dataset. For example, the timeseries signal may be a type (e.g., temperature measurements) and frequency (e.g., hourly, daily) of the data entries within the timeseries dataset. That information may be received with the timeseries dataset. Thus, adjusting model execution based on the timeseries signal may improve accuracy and/or speed of execution. For example, if the timeseries signal indicates that the data within the timeseries dataset includes temperature measurements, the execution of the model may be adjusted for those measurements. In another example, if the data in the timeseries dataset includes security log codes, the execution of the model may be adjusted differently for that data than for the temperature measurements.

Thus, the model selection system may select one or more execution parameters based on the timeseries signal. For example, the anomaly detection model may be configured to use different settings depending on the model execution parameter. If the model execution parameter indicates that temperature measurements will be used to search for anomalies, the model may adjust processing and/or output, based on that execution parameter, for temperature measurements.

In some embodiments, the model selection system may perform parameter adjustment/selection by creating a grid of multiple sets of parameter values, and fitting the selected model for each element on the grid/set. Each element in the grid may include a unique set of parameter values. The model selection system may compute a distribution of the anomalies resulting from each fitted instance and set a threshold to be one sigma deviation (assuming the distribution is always a gaussian distribution). The model selection system may then select those parameter values with the highest probability/score.

The model selection system may input the timeseries dataset and the model execution parameter into the anomaly detection model, and receive, from the anomaly detection model, one or more anomalies associated with the timeseries dataset. Each detected anomaly may include corresponding timeseries data from the timeseries dataset. In some embodiments, each detected anomaly may have a probability value associated with the anomaly and the model selection system may include a probability threshold for determining which output values from the anomaly detection model are anomalies. In some embodiments, the model selection system may receive, from the anomaly detection model, one or more timestamps associated with each anomaly. Each timestamp may be associated with a detected anomaly.

In some embodiments, prior to inputting the timeseries dataset into an anomaly detection model, the model selection system may perform one or more preprocessing operations on the timeseries dataset. For example, is the timeseries dataset has a trend, the model selection system may apply a smoothing function to the dataset. In another example, if the data is seasonal, the model selection system may detect the period using the spectral/residual algorithm.

The model selection system may generate an alert or multiple alerts based on the one or more anomalies and transmit the alert or multiple alerts to an alert processing system. Each alert may include a timestamp associated with the anomaly and/or data describing the anomaly.

In some embodiments, the model selection system may perform the following actions when selecting an anomaly detection model. The model selection system may compare the temporal trait with stored temporal traits (e.g., stored in a database). For example, each temporal trait may be stored in association with a corresponding anomaly detection model (e.g., in a database table) and the model selection system may compare the temporal trait identified for the timeseries dataset with stored temporal traits.

The model selection system may identify, based on the comparing, a matching temporal trait of the plurality of temporal traits. For example, if the temporal traits are stored in a database table with a corresponding anomaly detection model, the model selection system may identify the table entry that matches the identified temporal trait. The model selection system may select the anomaly detection model based on the anomaly detection model corresponding to the matching temporal trait. For example, the model selection system may access the table entry that matches the identified temporal trait and retrieve from the table entry the corresponding anomaly detection model.

Another way to improve anomaly detection is to process a multitude of timeseries datasets for a time period (e.g., 90 days) to detect anomalies from those timeseries datasets and then correlate those detected anomalies by generating an anomaly timeseries dataset and identifying anomalies within the anomaly timeseries dataset. For example, computer systems for a computing environment may each generate thousands of events daily. When each dataset is run through an anomaly detection model, the resulting number of detected anomalies may be in the magnitude of hundreds, with those anomalies not necessarily indicating an issue. For a person to review each anomaly may be time consuming and inefficient. Thus, to focus on anomalous activity within the sets, the system may generate a timeseries dataset of the detected anomalies and execute anomaly detection on that dataset. Any detected anomalies from the anomalies timeseries dataset may indicate to a user that there is anomalous activity that needs to be investigated.

Thus, in some embodiments an anomaly detection system may receive a plurality of timeseries datasets. Each timeseries dataset may include a timestamp and a corresponding value. The data within each timeseries dataset is arranged chronologically using the timestamps. Timeseries datasets may include the same type of data. For example, all datasets may include event log data from different computing systems within a computing environment.

In some embodiments, timeseries datasets may include different types of data. For example, one timeseries dataset may include event log data from computing systems and another timeseries dataset may include temperature data measured around those computing systems. Thus, the timeseries datasets may include a first dataset having a first type of data and a second dataset having a second type of data. The datasets with different types of data may be input into different anomaly detection models. Thus, the anomaly detection system may select, based on the first type of data, a first anomaly detection model for the first dataset. For example, the anomaly detection system may select an anomaly detection model suited for processing event log data. The anomaly detection system may select, based on the second type of data, a second anomaly detection model for the second dataset. For example, the anomaly detection system may select an anomaly detection model suited for processing temperature data for that type of data.

In some embodiments, the anomaly detection system may input each timeseries dataset into an anomaly detection model to obtain a plurality of sets of timestamps. Each set of timestamps may represent an anomaly detected within a corresponding timeseries dataset. For example, the output of the anomaly detection model may be a timestamp and a probability or a score that the particular timestamp is associated with a value indicating an anomaly. For each timeseries dataset there may be multiple anomalies, or no anomalies detected. For example, if a thousand timeseries datasets are input into an anomaly detection model (or one or more different anomaly detection models) the output for each dataset may include one or more timestamps and a probability that each timestamp is associated with an anomalous value. Thus, the anomaly detection system may receive, from one or more anomaly detection models, sets of timestamps. Each set of timestamps may include one or more timestamps representing one or more anomalies detected within a corresponding timeseries dataset.

In some embodiments, the anomaly detection system may combine timestamps within the plurality of sets of timestamps into an anomaly dataset and sort the anomaly dataset into a chronologically ordered dataset. For example, the anomaly detection model may select a first set of timestamps corresponding to anomalies detected in that particular set, and store, in a data structure, the timestamps of the first set in a chronological order. The anomaly detection system may select other sets of timestamps and add each timestamp from the one or more sets into the data structure. After adding each timestamp from the other sets to the data structure, results in the data structure including timestamps from both the first set and the one or more sets arranged in the chronological order. In some embodiments, the anomaly detection model may sort and combine the timestamps from the different timeseries datasets into a chronological ordered timeseries as part of the aggregation function and avoid the separate sorting and combining steps.

The anomaly detection system may then aggregate, based on a time interval, the chronologically ordered dataset into an anomaly timeseries dataset. The anomaly timeseries dataset may include timestamps and a corresponding number of anomalies detected during a corresponding time interval. In some embodiments, to aggregate the data, anomaly detection system may retrieve the time interval (e.g., aggregation per hour), and retrieve, from the chronologically ordered dataset, a time associated with a first timestamp stored in a first position within the chronologically ordered dataset. That is, the anomaly detection system may select the earliest timestamp. The anomaly detection system may traverse the chronologically ordered dataset until a second timestamp is reached. The second timestamp may be the last timestamp within the time interval associated with the first timestamp. For example, if the aggregation interval is one hour (e.g., hourly) and the first timestamp indicates 2:11 PM, the anomaly detection system may retrieve the chronologically first timestamp and determine which timeslot the timestamp belongs to (e.g., 2 PM to 3 PM) by adding one hour to the timestamp and rounding down to the nearest hour and subtracting one hour and rounding up to the nearest hour, making the time interval 2 PM to 3 PM.

The anomaly detection model may then traverse the chronologically ordered dataset until a second timestamp is reached. The second timestamp may be the last timestamp within the time interval associated with the first timestamp. For example, the anomaly detection model may traverse the data until the last timestamp is reached (e.g., the last timestamp before 3 PM). When the second timestamp is reached, the anomaly detection model may generate an aggregated value based on all the timestamps starting from the first timestamp and ending with the second timestamp. The aggregated value may represent a count of anomalies detected starting with the first timestamp and ending with the second timestamp. For example, if there are ten timestamps that are traversed between 2 PM and 3 PM, the anomaly detection system may store the value ten in association with the time interval of 2 PM-3 PM.

In some embodiments, the anomaly detection system may aggregate the values based on different characteristics of the data within the time interval. For example, if the data includes temperatures, the anomaly detection system may determine the mean temperature during the time interval and use that value as the aggregated valued for that time interval. In some embodiments, the anomaly detection system may aggregate the data by summing up the values corresponding to the different data points.

When the data has been aggregated, the anomaly detection model may input the anomaly timeseries dataset into an anomaly detection model to obtain one or more anomalies detected by the anomaly detection model. For example, the anomaly detection system may input the anomaly timeseries dataset into an anomaly detection model and receive the output that includes one or more timestamps and a probability that the particular timestamp is associated with an anomaly. In some embodiments, the anomaly detection system may determine which timestamps are associated with anomalies based on a threshold probability or score value. That is, if the associated probability or score is higher than the threshold, the anomaly detection system may identify a particular timestamp as an anomaly. In another example, the anomaly detection system may remove from the one or more anomalies those anomalies that do not meet the anomaly confidence threshold. Once one or more anomalies have been identified, the anomaly detection system may generate one or more alerts based on the one or more anomalies, and transmit the one or more alerts to an alert processing system.

Another way to improve anomaly detection is to divide a dataset into multiple datasets based on a type of anomaly detection requested. For example, the anomaly detection system may receive a request to detect anomalous activity with the request including a data attribute. For example, the anomaly detection system may receive a request to detect anomalous activity in event log data that has been received from a multitude of computing devices (e.g., computer systems, routers, switches, and/or other computing devices). The data may be stored in a table and organized based on each event. In one example, the request may include a username, so that the anomaly detection system may break down the data into datasets based on a username. In another example, the request may include a computing device name as the dividing field. Thus, the anomaly detection system may divide the data into timeseries datasets corresponding to each computing device. In another scenario, the data may be temperature data or weather data and the dividing field may be a location (e.g., county, town, etc.). In yet another scenario the data may be fraud detection data with the client identifier being a dividing field. A person skilled in the art would understand that other examples with other types of data are contemplated by this disclosure.

In addition to receiving the request, the anomaly detection system may receive a dataset that includes event data for events (e.g., computing system events or other types of events, weather events, client activity events, or another suitable set of events). The event data may include a plurality of fields including a timestamp field, a value field, and a plurality of attribute fields.

In some embodiments, the anomaly detection system may compare the data attribute with each attribute field, and determine, based on the comparing, a dividing attribute for the dataset. The comparison may be a textual comparison. As mentioned above, the dividing attribute may be a username, system name, county, town, client identifier and/or another suitable field. A person skilled in the art would understand that the dividing attribute may be a combination of fields (e.g., username and system name).

The anomaly detection system may divide, based on the dividing attribute, the dataset into multiple datasets. For example, if the dividing attribute is a computer system, the anomaly detection system may generate a dataset for each computer system. In another example, if the dividing attribute is a username, the anomaly detection system may generate a dataset for each username found in the received dataset.

The anomaly detection system may then aggregate, based on a time interval, the datasets into timeseries datasets. For example, the anomaly detection system may aggregate data into hourly intervals and have one entry per hour with a corresponding number of events. In some embodiments, the anomaly detection system may sort each timeseries dataset into a chronological order based on timestamps and aggregate those data points into hourly values. For example, there may be fifteen events between 2 PM and 3 PM. Thus, the anomaly detection system may generate one timestamp (e.g., 2 PM) and add a corresponding value of fifteen in association with that timestamp.

In some embodiments, the anomaly detection system may aggregate the values based on different characteristics of the data within the time interval. For example, if the data includes temperatures, the anomaly detection system may determine the mean temperature during the time interval and use that value as the aggregated valued for that time interval. In some embodiments, the anomaly detection system may aggregate the data by summing up the values corresponding to the different data points.

When the timeseries datasets are ready (or as each timeseries dataset is ready) the anomaly detection system may input the timeseries datasets into one or more anomaly detection models to obtain sets of anomalies. For example, the anomaly detection system may use one or more different anomaly detection models for the different datasets. In some embodiments, the anomaly detection system may use one anomaly detection model, while in other embodiments, the anomaly detection system may use multiple models. For example, the anomaly detection system may use multiple models for different data types. Each anomaly detection model may output none, one or more anomalies for each timeseries dataset.

When the anomalies are received from the one or more anomaly detection models, the anomaly detection system may generate an anomaly timeseries dataset from the sets of anomalies. In some embodiments, the anomaly detection system may combine and sort into a chronological order all the anomalies in the sets of anomalies. Then the anomaly detection model may aggregate the resulting dataset. Aggregation may include a number of actions. For example, the anomaly detection system may aggregate over a specific aggregation time interval (e.g., one minute, one hour, one day, or another suitable aggregation interval). For example, the anomaly detection system may retrieve an aggregation time interval, which may be stored in memory and/or in physical storage. The anomaly detection system may also retrieve, from a chronologically ordered dataset, a time associated with a first timestamp stored in a first position within the chronologically ordered dataset. That is, the timestamp may be the earliest timestamp in the dataset. For example, the earliest timestamp may be 1-1-2021 14:03:00 (2:03 PM on Jan. 1, 2021). The anomaly detection system may then traverse the chronologically ordered dataset until a second timestamp is reached. The second timestamp may be the last timestamp within the time interval associated with the first timestamp. For example, the time interval may be between 2 PM and 3 PM, thus the second timestamp may be 1-1-2021 14:59:00 (2:59 PM on Jan. 1, 2021).

The anomaly detection system may then generate an aggregated value based on all the timestamps starting from the first timestamp and ending with the second timestamp. The aggregated value may represent a count of anomalies detected starting with the first timestamp and ending with the second timestamp. For example, if there are ten timestamps between the first timestamp and the second timestamp, the anomaly detection system may aggregate those timestamps into a value of twelve for the timeslot (the ten timestamps plus the first timestamp and the second timestamp).

When the anomaly timeseries dataset is ready, the anomaly detection system may input the anomaly timeseries dataset into an anomaly detection model to obtain one or more anomalies. In some embodiments, the anomaly detection system may use the model selection system as described above and in the model selection section of this disclosure to select an appropriate model for anomaly detection, based on a temporal trait of the timeseries dataset. That is, the anomaly detection system may obtain anomalous behavior for anomalies detected in the previously discussed datasets. The anomaly detection system may then generate one or more alerts based on the one or more anomalies and transmit the one or more alerts to an alert processing system. For example, the anomaly detection system may generate one alert per an anomaly, combine alerts for several anomalies, and/or generate one alert and transmit it to the user in response to the user request. In some embodiments, the alert may be a message or output provided to a user. For example, the message may be generated indicating a result of the anomaly detection, which can be sent to the user (e.g., at a user's terminal, smart phone, or another device). In some embodiments, the alert is presented to the user on the same device that the anomaly detection system is executed.

Various other aspects, features and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 illustrates an exemplary timeseries dataset that includes timestamps and corresponding number of security events, in accordance with one or more embodiments of this disclosure.

FIG. 4 illustrates a table with temporal traits matching different anomaly detection models, in accordance with one or more embodiments.

FIG. 5 illustrates a table with different timeseries signals and associated model execution parameters, in accordance with one or more embodiments.

FIG. 10 illustrates exemplary sets of timestamps from different datasets representing times of detected anomalies, in accordance with one or more embodiments of this disclosure.

FIG. 11 illustrates a table that includes timeslots and corresponding number of anomalies, in accordance with one or more embodiments of this disclosure.

FIG. 14 illustrates fields of a dataset of system log entries, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Model Selection

Figure 1:
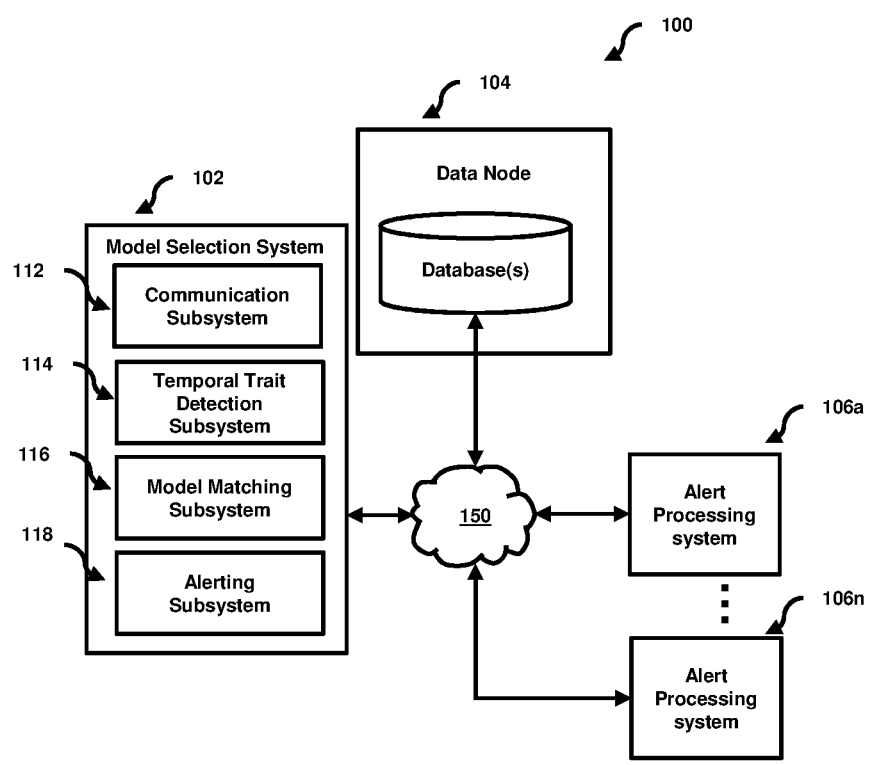
FIG. 1 shows an illustrative system for selecting an anomaly detection model, in accordance with one or more embodiments of this disclosure.

FIG. 1 illustrates system 100 for selecting an anomaly detection model. System 100 includes model selection system 102, data node 104 and alert processing systems 106a-106n connected by network 150. Model selection system 102 may execute instructions for selecting an appropriate anomaly detection model. Model selection system 102 may include software hardware or the combination of the two. For example, model selection system 102 may be a physical server or a virtual server that is running on top of a physical computer system. Data node 104 may store timeseries data (e.g., in one or more databases). Data node 104 may include software hardware or the combination of the two. For example, data node 104 may be a physical server or a virtual server that is running on top of a physical computer system. Alert processing systems 106a-106n may process alerts generated based on detected anomalies. Alert processing systems 106a-106n may include software, hardware, or a combination of the two. For example, each alert processing system may be a physical server or a virtual server that is running on top of a physical computer system. Model selection system 102, data node 104 and alert processing systems 106a-106n may reside on the same hardware servers or different hardware servers. In some embodiments, these components may reside on virtual servers. Network 150 may be a local area network, a wide area network (e.g., the Internet), or a combination of the two.

Model selection system 102 may be configured to receive a timeseries dataset, for example, from data node 104. The timeseries dataset may include values and corresponding timestamps. For example, FIG. 2 illustrates an exemplary timeseries dataset 200 that includes timestamps and corresponding number of security events. Column 202 of FIG. 2 includes timeslots while column 204 includes a corresponding number of security events. The number of security events in column 204 have been aggregated on an hourly basis. Thus, for example, each of the security events in row 206 may have been recorded between the timestamp of row 206 and the timestamp of row 208. Therefore, in some embodiments, data node 104 or model selection system 102 may aggregate received data into a timeseries dataset. In other examples, timeseries datasets may include communications records (e.g., from financial transactions), temperatures (e.g., daily, weekly, hourly, etc.), or other suitable data.

Model selection system 102 may receive the timeseries dataset using communication subsystem 112. Communication subsystem 112 may include software components, hardware components, or a combination of both. For example, communication subsystem 112 may include a network card (e.g., a wireless network card and/or a wired network card) that is coupled with software to drive the card. When the timeseries dataset is received, communication subsystem 112 may pass the received timeseries dataset to temporal trait detection subsystem 114.

Temporal trait detection subsystem 114 may determine a temporal trait associated with the timeseries dataset. As referred to herein, the temporal trait identifies a pattern within the timeseries dataset. Temporal trait detection subsystem 114 may execute a function for determining a temporal trait of a timeseries dataset. The temporal traits may include a determination whether the data has a trend, heteroscedasticity, seasonality, an approximate constant, or another suitable temporal trait.

Figure 3:
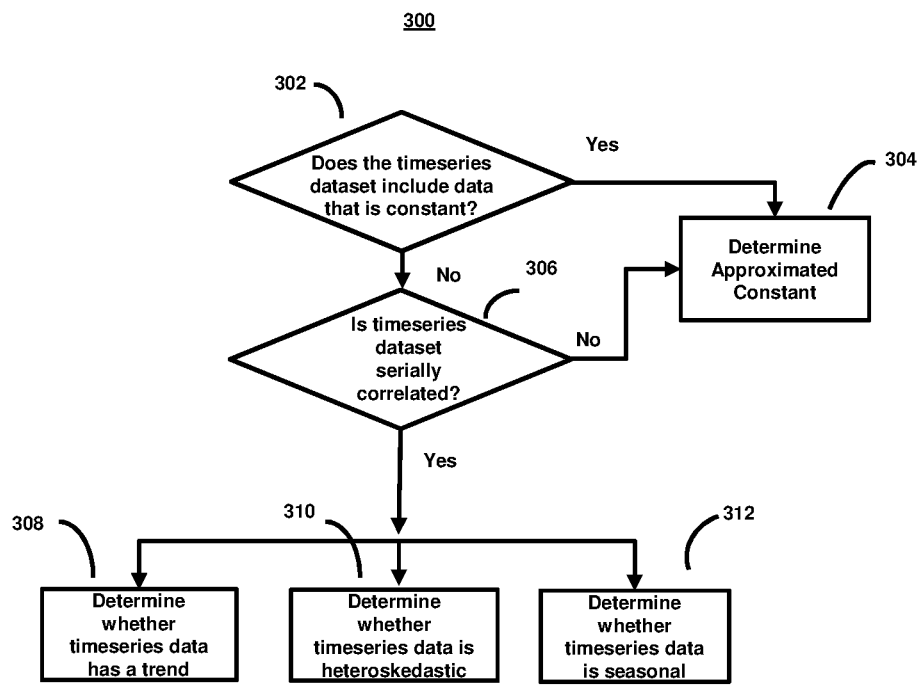
FIG. 3 illustrates actions for determining a temporal trait associated with a timeseries dataset, in accordance with one or more embodiments.

To make the determination, temporal trait detection subsystem 114 may execute a detection process that includes a number of actions. FIG. 3 illustrates actions for determining a temporal trait associated with a timeseries dataset. At 302, temporal trait detection subsystem 114 may determine whether the timeseries dataset includes data that is constant. Temporal trait detection subsystem may perform this action by analyzing the values for each timestamp within the timeseries dataset to determine whether the values are substantially constant. If the data is determined to be constant, process 300 moves to 304, where temporal trait detection subsystem 114 may determine an approximated constant.

If temporal trait detection subsystem 114 determines that the timeseries dataset does not include data that is constant, process 300 moves to 306. At 306, temporal trait detection subsystem 114 may determine whether the timeseries dataset is serially correlated. This is sometimes referred to as time correlation. For example, temporal trait detection subsystem 114 may execute an adapted Durbin-Watson test that includes determining whether residuals of a linear fit are autocorrelated. If the timeseries dataset is not serially correlated, process 300 moves to 304, where temporal trait detection subsystem 114 may determine an approximate constant for the timeseries dataset. If the timeseries dataset is serially correlated, process 300 moves to perform actions 308, 310, and 312.

At 308, temporal trait detection subsystem 114 determines whether the timeseries data has a trend. Temporal trait detection subsystem 114 may execute a combination of Dickey-Fuller and Kwiatkowski-Phillips-Schmidt-Shin (KPSS) for stationary and trend-stationary tests to determine whether the series data exhibits a linear trend (e.g., whether the mean changes linearly). As a result of executing these tests, temporal trait detection subsystem 114 may determine whether the series data has trend.

At 310, temporal trait detection subsystem 114 determines whether timeseries data is heteroskedastic. To determine whether the timeseries data is heteroskedastic, temporal trait detection subsystem 114 may execute constant variance on the residuals of a linear fit (sometimes referred to as homoscedasticity). At 312, temporal trait detection subsystem 114 determines whether the timeseries data is seasonal. For example, temporal trait detection subsystem 114 may execute a Fisher-G-Test which determines whether the series exhibits a significant cyclic pattern. In some embodiments, an asymptotic solution to the Fisher-G-Test may be adopted.

In some embodiments, temporal trait detection subsystem 114 may generate a schema for the timeseries dataset. The schema may include a flag indicating the temporal trait. For example, the schema may be in a form of an XML file or another data structure that may be associated with the timeseries dataset. The flag may be textual data indicating the temporal trait or may be a numeric or an alphanumeric string that maps to different temporal traits and/or anomaly detection models. In some embodiments, the schema may include a flag indicating the type of data that is included in the timeseries dataset sometimes referred to as timeseries signal.

When temporal trait detection subsystem 114 determines a temporal trait in the timeseries dataset, the temporal trait detection subsystem may pass the temporal trait to model matching subsystem 116. Model matching subsystem 116 may select, based on the temporal trait, from a plurality of anomaly detection models, an anomaly detection model for detecting anomalies in the timeseries dataset. That is, each model of the plurality of anomaly detection models may be matched with a corresponding temporal trait. FIG. 4 illustrates a table with temporal traits matching different anomaly detection models. Rows 402 illustrates that Model 1 will be used for timeseries datasets that have trending data while row 404 illustrates that Model 2 will be used for timeseries datasets that exhibit heteroscedasticity.

In some embodiments, model matching subsystem 116 may perform the following operations when selecting the anomaly detection model. Model matching subsystem 116 may compare the temporal trait with a plurality of temporal traits. Each temporal trait may be stored in association with a corresponding anomaly detection model (e.g., as illustrated in FIG. 4). Model matching subsystem 116 may identify, based on the comparing, a matching temporal trait. For example, model matching subsystem 116 may traverse the temporal trait column in table 400 until the determined temporal trait matches a temporal trait in the temporal trait column. When model matching subsystem 116 identifies the correct temporal trait, model matching subsystem 116 may select the anomaly detection model corresponding to the matching temporal trait. In one example, each temporal trait may have a corresponding machine learning model trained for detecting anomalies in timeseries datasets classified under each temporal trait. In some embodiments, each model is trained with datasets classified to include a specific type of timeseries data. For example, a model to be used with trending datasets, is trained using datasets previously classified as having trend. In another example, a model to be used with seasonal datasets, is trained using datasets previously classified as seasonal.

In some embodiments, a corresponding model may be trained for each temporal trait with appropriate data for that specific temporal trait. For example, a model may be trained with trending datasets to be used on timeseries datasets that are determined to have trend. In another example, a model may be trained for seasonal timeseries datasets using datasets that are labeled as seasonal. In some embodiments, different types of anomaly detection models may be used for timeseries datasets associated with different traits. For example, for timeseries datasets having a seasonal temporal trait, the anomaly detection system may use a Spectral Residual model or a Seasonal Hybrid Extreme Studentized Deviate (SHESD) model. In another example, for timeseries datasets having a non-seasonal series serial correlation, model matching subsystem 116 may use an Exponential Moving Average (EMA) model and/or Holts-Winters forecasting model. In yet another example, for timeseries datasets that are non-serial correlated or constant (e.g., having constant data signals), model matching subsystem 116 may use a Gaussian/KDE model or another model (e.g., distribution or threshold model). In addition, model matching subsystem 116 may apply different transformation or transformations during preprocessing based on the temporal trait and/or the model used.

In some embodiments, model matching subsystem 116 may determine model execution based on timeseries signal. The model matching subsystem may determine a timeseries signal associated with the timeseries dataset. For example, if the data in the timeseries dataset is temperature measurements (timeseries signal) model execution may be adjusted to fit those measurements. If the data in the timeseries dataset indicates a number of events (timeseries signal), model execution may be adjusted to fit that data. Thus, model matching subsystem may select the model execution parameter based on the timeseries signal. FIG. 5 illustrates a table with different timeseries signals and associated model execution parameters. For example, timeseries signal indicating temperature measurements may correspond to Parameter 1 of model execution parameters. Timeseries signal for security log data (e.g., security log entries) may correspond to parameter 2. In some embodiments, model matching subsystem 116 may adjust thresholds for different statistical tests/models such as a p-value for a seasonal test, a p-value for a serial-correlated test based on the timeseries signal. In some embodiments, model matching subsystem 116 may adjust general probability thresholds based on the timeseries signal. One or more of those parameters may be model execution parameters.

In some embodiments, model matching subsystem 116 may perform parameter adjustment/selection by creating a grid of multiple sets of parameter values, and fitting the selected model for each element on the grid/set. Each element in the grid may include a unique set of parameter values. Model matching subsystem 116 may compute a distribution of the anomalies resulting from each fitted instance and set a threshold to be one sigma deviation (assuming the distribution is always a gaussian distribution). Model matching subsystem 116 may then select those parameter values with the highest probability/score.

In some embodiments, model matching subsystem 116 may perform one or more preprocessing operations on the timeseries dataset. For example, is the timeseries dataset has a trend, the model selection system may apply a smoothing function to the dataset. In another example, if the data is seasonal, the model selection system may detect the period using the spectral/residual algorithm. In yet another example, if the timeseries dataset is approximately constant, model matching subsystem 116 may perform Gaussian/KDE transformation.

Model matching subsystem 116 may input the timeseries dataset into the anomaly detection model, and receive, from the anomaly detection model, one or more anomalies associated with the timeseries dataset. In some embodiments, model matching subsystem 116 may input the model execution parameter into the anomaly detection model so that the execution of the model is modified, as discussed above. Model matching subsystem 116 may receive from the anomaly detection model timestamps and corresponding probabilities or scores that indicate the likelihood that the timestamp is associated with an anomaly. Model matching subsystem 116 may retrieve a threshold value and compare the threshold value with each probability or score to identify the timestamps that are associated with anomalies. For example, the threshold value may be fifty percent, 0.5, or another suitable value. Any timestamp with a lower probability or score may be removed from the set of anomalies.

Figure 6:
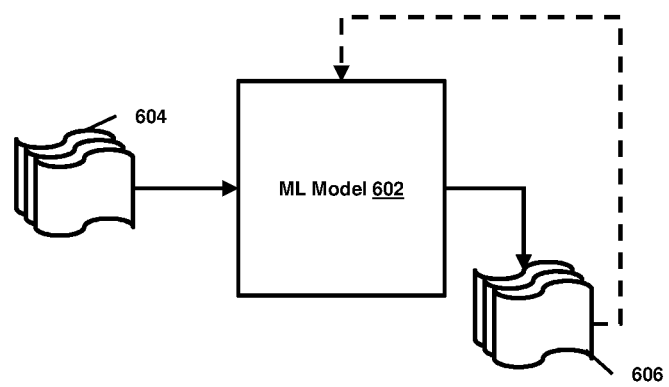
FIG. 6 illustrates an exemplary anomaly detection model based on machine learning, in accordance with one or more embodiments.

FIG. 6 illustrates an exemplary anomaly detection model based on machine learning. Machine learning model 602

(e.g., anomaly detection model) may take input 604 (e.g., timeseries dataset) and may output timestamps 606 (sometimes referred to as output parameters) corresponding to anomalies detected by the model. Timestamps 606 may be output together with a probability that a particular timestamp corresponds to an anomaly detected in the timeseries dataset. Model matching subsystem 116 may pass each detected anomaly to alerting subsystem 118.

The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions.

In some embodiments, the machine learning model may include an artificial neural network. In such embodiments, machine learning model may include an input layer and one or more hidden layers. Each neural unit of the machine learning model may be connected with one or more other neural units of the machine learning model. Such connections may be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model and an input known to correspond to that classification may be input into an input layer of machine learning model during training. During testing, an input without a known classification may be input into the input layer, and a determined classification may be output.

A machine learning model may include embedding layers at which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on a graph and/or vector.

In some embodiments, machine learning model 602 may be trained to perform anomaly detection using one or more supervised techniques. As an example, a training dataset including entries labeled with "anomalous," "normal," or one or more other labels or label sets may be obtained and used to train machine learning model 602. In one use case, an entry without an anomaly may be labeled as "nominal," while an entry including anomalous data may be labeled "anomaly." In another use case, a Boolean may be used to label anomalous entries versus normal entries such that a "True" label represents an entry including anomalous value(s), and a "False" label represents an entry without an anomalous value.

In some embodiments, machine learning model 602 may be trained to perform anomaly detection using one or more unsupervised techniques. For example, an isolation forest algorithm or other decision tree algorithm may be used to configure machine learning model 602 based on a training dataset in an unsupervised manner. In one use case, an isolation or other decision tree (e.g., corresponding to machine learning model 602) may be trained or generated by selecting one or more features from the training dataset (e.g., selecting one or more parameters of the training dataset) and randomly selecting one or more values for a selected feature for splitting the data of that feature (e.g., randomly selecting a value between maximum and minimum values of that feature). In this way, for example, the decision tree will have a high likelihood of shorter paths in decision trees for anomalous data points, thereby identifying data points corresponding to anomalous data.

Alerting subsystem 118 may generate an alert based on the one or more anomalies. For example, alerting subsystem 118 may generate one alert for each detected anomaly. The alert may include timeseries data associated with the timestamp for which the anomaly was detected. In some embodiments, alerting subsystem 118 may generate one alert for all detected anomalies and include the timeseries data associated with each timestamp. When the alert or alerts are generated, alerting subsystem 118 may pass the alert or alerts to communication subsystem 112.

In some embodiments, alerting subsystem 118 may determine a destination system/address for the alert to be sent to. Alerting subsystem 118 may determine that the timeseries dataset includes data associated with one or more security logs from one or more computer systems. For example, alerting subsystem 118 may access timeseries dataset schema described above in relation to the time series signal. The schema may include an indication (e.g., a flag) that the time series dataset includes security log data. Alerting subsystem 118 may then retrieve one or more security parameters associated with a security log entry corresponding to a detected anomaly. For example, the security parameters may be retrieved from the security event associated with the timestamp when the anomaly was detected. Those parameters may include the computer system associated with the event, username, action type, and other suitable parameters. In some embodiments, the parameters may indicate the alerting system that is appropriate for the event. Alerting subsystem 118 may select, based on the one or more security parameters, an alert processing system corresponding to security log processing. For example, alerting subsystem 118 may select alert processing system 106a for security events.

A person skilled in the art would understand that alerting subsystem 118 may target alerts to different alert processing systems 106n based on the type of timeseries data. In another example, alerting subsystem 118 may determine that the timeseries dataset includes data associated with a plurality of communication records or transactions. For example, those records may be user transactions using various transaction methods. Alerting subsystem 118 may retrieve one or more type of parameters associated with a communication record corresponding to a detected anomaly, and select, based on the one or more type parameters, the alert processing system (e.g., alert processing system 106n) corresponding to communication record processing.

When the alerts have been created, alerting subsystem 118 may pass the alert or alerts to communication subsystem 112. Communication subsystem 112 may transmit (e.g., via network 150) the alert or alerts to an appropriate alert processing system (e.g., alert processing system 106a).

Figure 7:
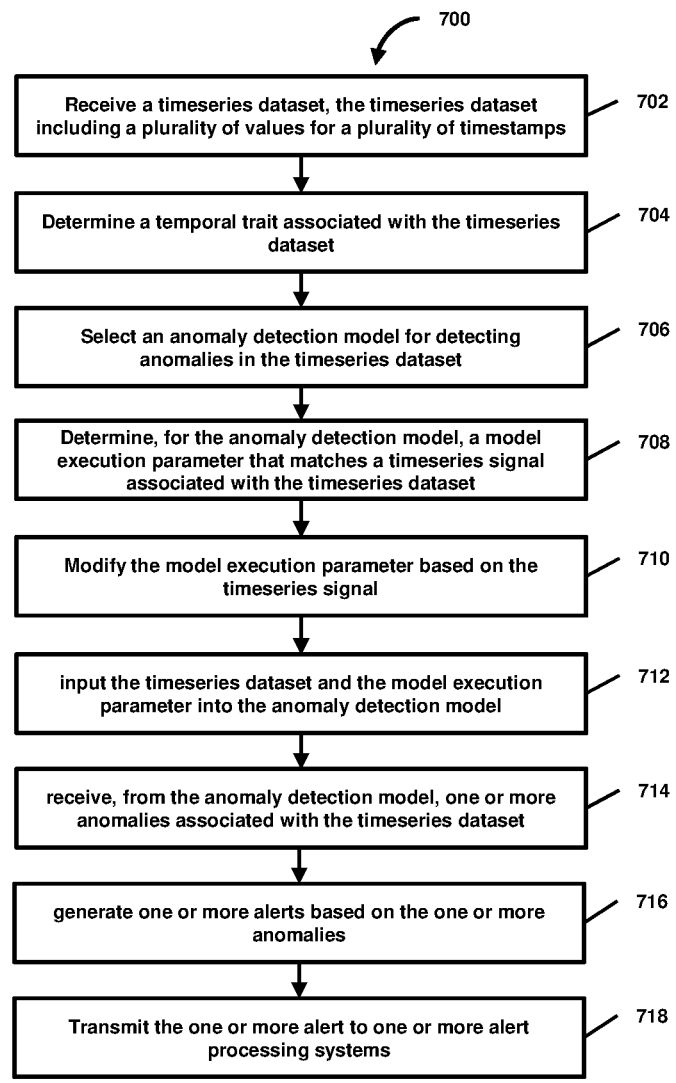
FIG. 7 illustrates an exemplary process for detecting anomalies in timeseries datasets based on temporal traits, in accordance with one or more embodiments.

FIG. 7 illustrates an exemplary process 700 for detecting anomalies in timeseries datasets based on temporal traits. At 702, model selection system 102 receives a timeseries dataset, the timeseries dataset including a plurality of values for a plurality of timestamps. The model selection system may receive the timeseries dataset from a database (e.g., a database residing on data node 104). Model selection system 102 may include one or more processors, memory and other components described above. At 704, model selection system 102 determines a temporal trait associated with the timeseries dataset. The temporal trait may identify a pattern within the timeseries dataset, the pattern indicating a trend, heteroscedasticity, seasonality, or an approximate constant. Model selection system 102 may use one or more processors to make the determination.

At 706, model selection system 102 selects an anomaly detection model for detecting anomalies in the timeseries dataset. Each model may be matched with a corresponding temporal trait. For example, model selection system 102 may perform temporal trait analysis (e.g., using one or more processors) and access a lookup table (e.g., illustrated in FIG. 4) to perform the selection. At 708, model selection system 102 determines a timeseries signal associated with the timeseries dataset. Model selection system 102 may make the determination using one or more processors and access table 500 of FIG. 5 to perform a lookup. At 710, model selection system 102 selects a model execution parameter based on the timeseries signal. For example, model selection system 102 may use one or more processors to generate a data structure corresponding to the parameter such that the data structure may be used as input into an anomaly detection model. In some embodiments, if the timeseries data is temperature measurements, the model execution parameter may be selected to indicate temperature data. If the timeseries data includes counts of occurrences, the model execution parameter may be selected to indicate count of occurrences.

At 712, model selection system 102 inputs the timeseries dataset and the model execution parameter into the anomaly detection model. For example, the anomaly detection model may be a machine learning model as illustrated in FIG. 6, which can reside in the model selection system or outside of the model selection system. If the machine learning model resides outside of the model selection system, the model selection system may send (or transmit) the data to another system that hosts the machine learning model.

At 714, model selection system 102 receives, from the anomaly detection model, one or more anomalies associated with the timeseries dataset. For example, the model selection system may receive from machine learning model 602 timestamps 606 that may include one or more anomalies. The anomalies may be timestamps. In some embodiments, model selection system 102 may receive probability/score information for every anomaly indicating how confident the machine learning model is that the anomaly has been properly detected.

At 716, model selection system 102 generates one or more alerts based on the one or more anomalies. Model selection system 102 may generate one or more alerts for the anomalies (e.g., one alert per anomaly). At 718, model selection system 102 transmits the one or more alerts to one or more alert processing systems.

Figure 8:
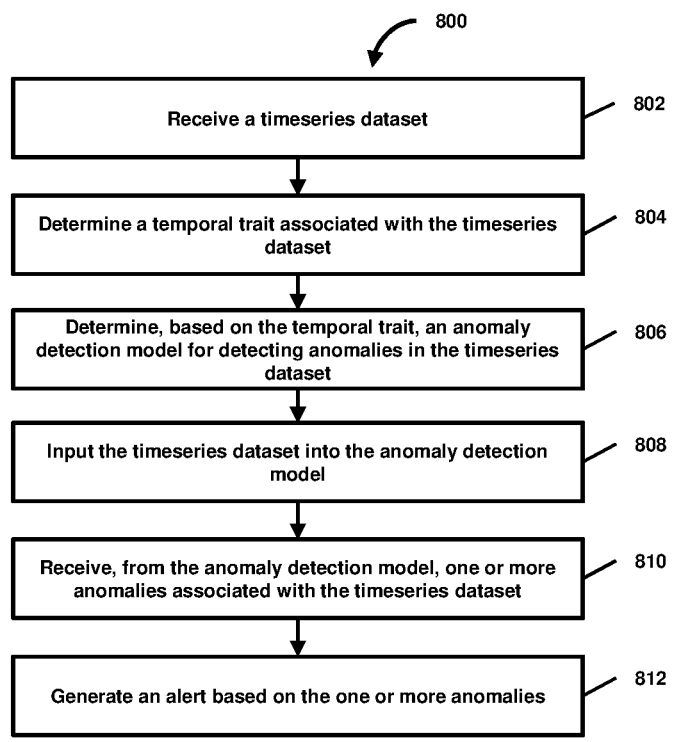
FIG. 8 illustrates another exemplary process for detecting anomalies in timeseries datasets based on temporal traits, in accordance with one or more embodiments.

FIG. 8 illustrates another exemplary process 800 for detecting anomalies in timeseries datasets based on temporal traits, in accordance with one or more embodiments. At 802, model selection system 102 receives a timeseries dataset. The timeseries dataset may include values for anomalies and corresponding timestamps. The model selection system may receive the timeseries dataset from a database (e.g., a database residing on data node 104). Model selection system 102 may include one or more processors, memory and other components described above.

At 804, model selection system 102 determines a temporal trait associated with the timeseries dataset. The temporal trait may identify a pattern within the timeseries dataset. The pattern may indicate a trend, heteroscedasticity, seasonality, or an approximate constant. Model selection system 102 may use one or more processors to make the determination. At 806, model selection system 102 determines, based on the temporal trait, an anomaly detection model for detecting anomalies in the timeseries dataset. Each model may be matched with a corresponding temporal trait. For example, model selection system 102 may perform temporal trait analysis (e.g., using one or more processors) and access a lookup table (e.g., illustrated in FIG. 4) to perform the selection.

At 808, model selection system 102 inputs the timeseries dataset into the anomaly detection model. For example, the anomaly detection model may be a machine learning model as illustrated in FIG. 6, which can reside in the model selection system or outside of the model selection system. If the machine learning model resides outside of the model selection system, the model selection system may send (or transmit) the data to another system that hosts the machine learning model.

At 810, model selection system 102 receives, from the anomaly detection model, one or more anomalies associated with the timeseries dataset. For example, the model selection system may receive from machine learning model 602 timestamps 606 that may include one or more anomalies. The anomalies may be timestamps. In some embodiments, model selection system 102 may receive probability/score information for every anomaly indicating how confident the machine learning model is that the anomaly has been properly detected. At 812, model selection system 102 generates an alert based on the one or more anomalies. Model selection system 102 may generate one or more alerts for the anomalies (e.g., one alert per anomaly).

The present techniques will be better understood with reference to the following enumerated embodiments:

1. A method comprising: receiving a timeseries dataset, the timeseries dataset comprising a plurality of values for a plurality of timestamps; determining a temporal trait associated with the timeseries dataset, wherein the temporal trait identifies a pattern within the timeseries dataset; determining, based on the temporal trait, an anomaly detection model of a plurality of anomaly detection models for detecting anomalies in the timeseries dataset; inputting the timeseries dataset into the anomaly detection model; receiving, from the anomaly detection model, one or more anomalies associated with the timeseries dataset; and generating an alert based on the one or more anomalies.

2. The method of any of the preceding embodiments, wherein each anomaly detection model of the plurality of anomaly detection models is matched with a corresponding temporal trait.

3. The method of any of the preceding embodiments, wherein determining the temporal trait associated with the timeseries dataset includes executing one or more algorithms on the timeseries dataset, wherein the one or more algorithms identify the timeseries data as trending, heteroskedastic, seasonal, or constant.

4. The method of any of the preceding embodiments, wherein determining a temporal trait associated with the timeseries dataset comprises generating a schema for the timeseries dataset, wherein the schema comprises a flag indicating the temporal trait.

5. The method of any of the preceding embodiments, further comprising: selecting a model execution parameter based on a timeseries signal associated with the timeseries dataset; and inputting the model execution parameter into the anomaly detection model.

6. The method of any of the preceding embodiments, further comprising: determining that the timeseries dataset comprises data associated with one or more security logs from one or more computer systems; retrieving one or more security parameters associated with a security log entry corresponding to a detected anomaly; and selecting, based on the one or more security parameters, an alert processing system corresponding to security log processing.

7. The method of any of the preceding embodiments, further comprising: determining that the timeseries dataset comprises data associated with a plurality of communication records; retrieving one or more type parameters associated with a communication record corresponding to a detected anomaly; and selecting, based on the one or more type parameters, the alert processing system corresponding to communication record processing.

8. The method of any of the preceding embodiments, wherein receiving, from the anomaly detection model, the one or more anomalies associated with the timeseries dataset comprises receiving one or more timestamps associated with each anomaly.

9. A tangible, non-transitory, machine-readable medium storing instructions that, when executed by a data processing apparatus, cause the data processing apparatus to perform operations comprising any of those in embodiments 1-8.

10. A system comprising: one or more processors; and memory storing instructions that, when executed by the processors, cause the processors to effectuate operations comprising any of those in embodiments 1-8.

11. A system comprising means for performing any of embodiments 1-8.

12. A system comprising cloud-based circuitry for performing any of embodiments 1-8.

Anomaly Detection Data Workflow for Timeseries Data

Figure 9:
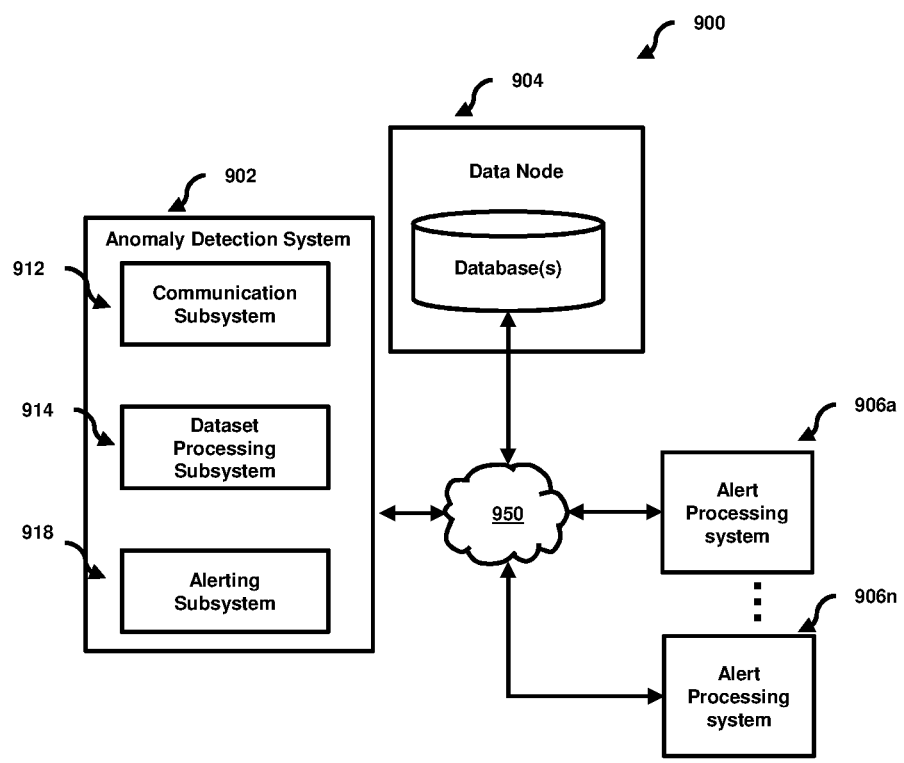
FIG. 9 shows an illustrative system for correlating events based on anomalies occurring within a given time interval across multiple timeseries datasets, in accordance with one or more embodiments of this disclosure.

FIG. 9 shows an illustrative system for correlating events based on anomalies occurring within a given time interval across multiple timeseries datasets. System 900 includes anomaly detection system 902, data node 904 and alert processing systems 906a-906n connected by network 950. Anomaly detection system 902 may execute instructions for correlating events based on anomalies occurring within a given time interval across multiple timeseries datasets. Anomaly detection system 902 may include software, hardware, or a combination of the two. For example, anomaly detection system 902 may be a physical server or a virtual server that is running on top of a physical computer system. Data node 904 may store timeseries data (e.g., in one or more databases). Data node 904 may include software hardware or the combination of the two. For example, data node 904 may be a physical server or a virtual server that is running on top of a physical computer system. Alert processing systems 906a-906n may process alerts generated based on detected anomalies. Alert processing systems 906a-906n may include software, hardware, or a combination of the two. For example, each alert processing system may be a physical server or a virtual server that is running on top of a physical computer system. Anomaly detection system 902, data node 904 and alert processing systems 906a-906n may reside on the same hardware servers or different hardware servers. In some embodiments, these components may reside on virtual servers. Network 950 may be a local area network, a wide area network (e.g., the Internet) or a combination of the two.

Anomaly detection system 902 may be configured to receive, from one or more anomaly detection models (e.g., located on data node 904), a plurality of sets of timestamps. Each set of the plurality of sets timestamps may include one or more timestamps representing one or more anomalies detected within a corresponding timeseries dataset. For example, the timeseries dataset may include values and corresponding timestamps. In some embodiments, one or more anomaly detection model may be models as illustrated by FIG. 6 and the accompanying disclosure. For example, FIG. 10 illustrates table 1000 of exemplary sets of timestamps from different datasets representing times of detected anomalies. Column 1002 of FIG. 10 includes timestamps corresponding to anomalies detected in a particular dataset, while column 1004 includes timestamps corresponding to anomalies detected in another dataset. While FIG. 10 illustrates anomalies based on data aggregated based on hourly basis, it is not a requirement that the data must be aggregated. Thus, in some of the datasets data may have looked like a dataset illustrated in FIG. 2, while other datasets may not have included aggregated data. Therefore, timestamps 1006 and 1008 may represent anomalies detected during those time intervals, based on aggregated data in a dataset.

Anomaly detection system 902 may receive the sets of timestamps using communication subsystem 912. Communication subsystem 912 may include software components, hardware components, or a combination of both. For example, communication subsystem 912 may include a network card (e.g., a wireless network card and/or a wired network card) that is coupled with software to drive the card. When the anomaly data is received, communication subsystem 912 may pass the received anomaly data to dataset processing subsystem 914.

Dataset processing subsystem 914 may combine the timestamps within the plurality of sets of timestamps into an anomaly dataset, and sort the anomaly dataset into a chronologically ordered dataset. In some embodiments, the combination and sorting may be performed essentially simultaneously. For example, dataset processing subsystem 914 may generate a data structure for storing an anomaly timeseries dataset and then iterate through each set of anomalies and place the anomalies into the data structure in a chronological order. In some embodiments, the combination and sorting operations may be performed separately. For example, dataset processing subsystem 914 may generate a data structure and copy the timestamps representing anomalies detected in the different datasets into the data structure. Dataset processing subsystem 914 may then sort the timestamps into a chronological order.

In another example, dataset processing subsystem 914 may store, in a data structure (e.g., in memory), a first set of the plurality of sets of timestamps in a chronological order. For example, dataset processing subsystem 914 may copy the data from the first set into a newly generated data structure. Dataset processing subsystem 914 may then select, each set of the plurality of sets of timestamps (e.g., in parallel or sequentially), and place each timestamp from the selected set into the data structure in the chronological order. That is, dataset processing subsystem 914 may process each timestamp to place it into a correct location in the data structure.

Dataset processing subsystem 914 may aggregate, based on a time interval, the chronologically ordered dataset into an anomaly timeseries dataset. The anomaly timeseries dataset may include a plurality of timestamps and a corresponding number of anomalies detected during a corresponding time interval. In some embodiments, dataset processing subsystem 914 may perform the following operations to perform the aggregation. Dataset processing subsystem 914 may retrieve the time interval. For example, the time interval may be one minute, one hour, one day, or another suitable time interval. Dataset processing subsystem 914 may retrieve the time interval from memory or from another suitable location.

Furthermore, dataset processing subsystem 914 may retrieve, from the chronologically ordered dataset, a time associated with a first timestamp stored in a first position within the chronologically ordered dataset. For example, dataset processing subsystem 914 may access a data structure that stores the chronologically ordered dataset and retrieve the earliest entry (i.e., the first entry) in the dataset. In some embodiments, dataset processing subsystem 914 may determine a timeslot associated with the first timestamp. For example, if the time interval is one hour and the timestamp is 2021-01-01 01:11:00, dataset processing subsystem 914 may determine that the timeslot for the entry is between 1 PM and 2 PM on Jan. 1, 2021. The determination may be performed adding the time interval to the timestamp and rounding down to the nearest interval (e.g., nearest hour) and subtracting the time interval from the timestamp and rounding up the timestamp to the nearest interval (e.g., nearest hour).

Dataset processing subsystem 914 may then traverse the chronologically ordered dataset until a second timestamp is reached. The second timestamp may be the last timestamp within a timeslot associated with the first timestamp. For example, dataset processing subsystem 914 may iterate through each timestamp and compare each timestamp with the timeslot ending time. The process may proceed until a timestamp after the ending time is reached and then stop.

Dataset processing subsystem 914 may generate an aggregated value based on all the timestamps starting from the first timestamp and ending with a last timestamp prior to the second timestamp. The aggregated value may represent a count of anomalies detected starting with the first timestamp and ending with the second timestamp. For example, dataset processing subsystem 914 may add all the timestamps to arrive at the aggregated value for the specific timeslot.

In some embodiments, dataset processing subsystem 914 may aggregate the values based on different characteristics of the data within the time interval. For example, if the data includes temperatures, dataset processing subsystem 914 may determine the mean temperature during the time interval and use that value as the aggregated value for that time interval. In some embodiments, dataset processing subsystem 914 may aggregate the data by summing up the values corresponding to the different data points.

As discussed above, dataset processing subsystem 914 may aggregate the data based on an hourly interval. FIG. 11 illustrates table 1100 that includes timeslots and corresponding number of anomalies. Column 1102 includes timeslots 1106 and 1108, while column 1104 includes a number of anomalies detected in those timeslots.

Dataset processing subsystem 914 may input the anomaly timeseries dataset into an anomaly detection model to obtain one or more anomalies from the anomaly detection model. In some embodiments, dataset processing subsystem 914 may use the model selection system as described above and in the model selection section of this disclosure to select an appropriate model for anomaly detection, based on a temporal trait of the timeseries dataset. In some embodiments, the anomaly detection model may be a model as illustrated by FIG. 6 and the accompanying disclosure. For example, the output of the anomaly detection model may be timestamps or timeslots and for each a probability or a score that the particular timestamp or timeslot is associated with a value indicating an anomaly. For each timeseries dataset there may be multiple anomalies, or no anomalies detected. In some embodiments, dataset processing subsystem 914 may determine which timestamps are associated with anomalies based on a threshold probability or score value. That is, if the associated probability or score is higher than the threshold, dataset processing subsystem 914 may identify a particular timestamp as an anomaly. For example, dataset processing subsystem 914 may receive, from the anomaly detection model and based on the anomaly timeseries dataset, one or more probabilities corresponding to the one or more anomalies detected by the anomaly detection model, and retrieve an anomaly confidence threshold. The anomaly confidence value may be a threshold probability or a threshold score that determines whether a given probability corresponds to a positive detection of an anomaly.

Dataset processing subsystem 914 may remove from the one or more anomalies those anomalies that do not meet the anomaly confidence threshold.

Once one or more anomalies have been identified, dataset processing subsystem 914 may pass the anomalies to alerting subsystem 918. Alerting subsystem 918 may generate one or more alerts based on the one or more anomalies, and transmit the one or more alerts to an alert processing system. For example, alerting subsystem 918 may generate one alert for each detected anomaly. The alert may include timeseries data associated with the timestamp for which the anomaly was detected. In some embodiments, alerting subsystem 918 may generate one alert for all the detected anomalies and include the timeseries data associated with each timestamp. When the alert or alerts are generated, alerting subsystem 918 may pass the alert or alerts to communication subsystem 912. Communication subsystem 912 may transmit (e.g., via network 950) the alert or alerts to an appropriate alert processing system (e.g., alert processing system 106a).

In some embodiments, dataset processing subsystem 914 may process a multitude of timeseries datasets to identify anomalies to place into the anomaly timeseries dataset. Dataset processing subsystem 914 may receive a plurality of timeseries datasets. Each timeseries dataset may include a plurality of values for a plurality of timestamps. In addition, the plurality of timeseries datasets may include a first dataset with a first type of data and a second dataset with a second type of data. FIG. 2 illustrates one example of a portion of a dataset.

Dataset processing subsystem 914 may input each of the plurality of timeseries datasets into one or more anomaly detection models to obtain a plurality of sets of timestamps. Each set of the plurality of sets of timestamps may include one or more timestamps representing one or more anomalies detected within a corresponding timeseries dataset.

In some embodiments, dataset processing subsystem 914 may use different anomaly detection models for different types of data when inputting datasets into the models. For example, if data within the dataset is stationary, dataset processing subsystem 914 may use one model. However, when the data within a dataset is trending, dataset processing subsystem 914 may use another model. In some embodiments, dataset processing subsystem 914 may use one anomaly detection model for temperature data and another anomaly detection model for computer system event data. For example, dataset processing subsystem 914 may select, based on the first type of data, a first anomaly detection model for the first dataset and select, and based on the second type of data, a second anomaly detection model for the second dataset. Dataset processing subsystem 914 may input the first dataset into the first anomaly detection model and input second dataset into the second anomaly detection model.

Figure 12:
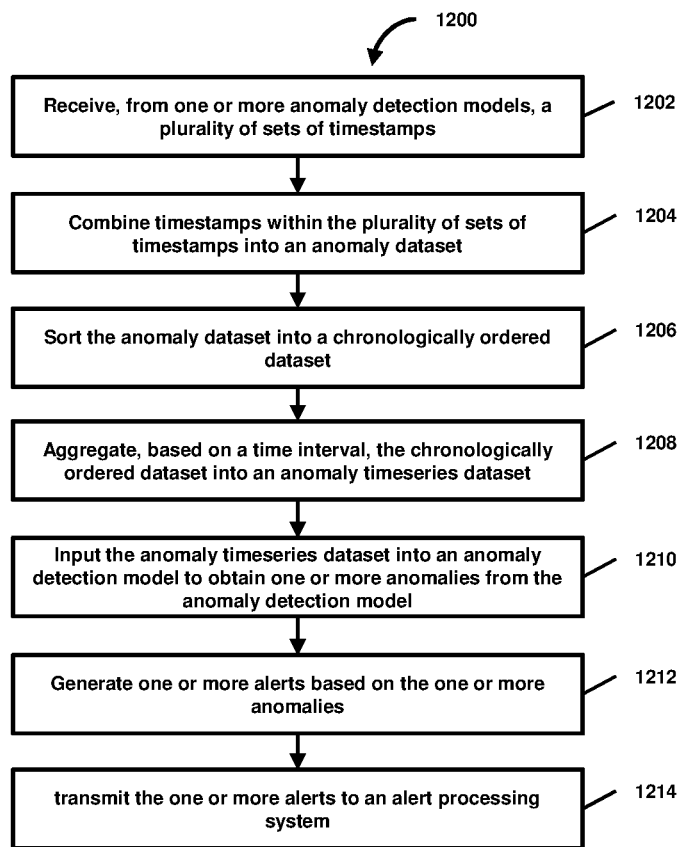
FIG. 12 illustrates an exemplary process for correlating events based on anomalies occurring within a given time interval across multiple timeseries datasets, in accordance with one or more embodiments of this disclosure.

FIG. 12 illustrates an exemplary process for correlating events based on anomalies occurring within a given time interval across multiple timeseries datasets, in accordance with one or more embodiments of this disclosure. Process 1200 of FIG. 12 may be performed by anomaly detection system 902 of FIG. 9. At 1202, anomaly detection system 902 receives, from one or more anomaly detection models, a plurality of sets of timestamps. The anomaly detection models may be hosted by data node 904, and/or anomaly detection system 902. Thus, the sets of timestamps may be received from data node 904 through network 950.

At 1204, anomaly detection system 902 combines timestamps within the plurality of sets of timestamps into an anomaly dataset. For example, anomaly detection system 902 may use one or more processors to perform the combining operation and store the resulting anomaly dataset in a memory and/or other storage. At 1206, anomaly detection system 902 sorts the anomaly dataset into a chronologically ordered dataset. For example, anomaly detection system 902 may use one or more processors to perform the sorting operation and may store the result in memory and/or other storage.

At 1208, anomaly detection system 902 aggregates, based on a time interval, the chronologically ordered dataset into an anomaly timeseries dataset. For example, anomaly detection system 902 may use one or more processors to perform the aggregating operation and may store the result in memory and/or other storage. At 1210, anomaly detection system 902 inputs the anomaly timeseries dataset into an anomaly detection model to obtain one or more anomalies from the anomaly detection model. For example, the anomaly detection model may be hosted by anomaly detection system 902, thus the input operation may be performed locally on the system. In another example, the anomaly detection model may be hosted by data node 904. In this example, anomaly detection system 902 may transmit the anomaly timeseries dataset to data node 904 and receive from data node 904 the detected anomalies. In some embodiments, one or more anomaly detection model may be models as illustrated by FIG. 6 and the accompanying disclosure.

At 1212, anomaly detection system 902 generates one or more alerts based on the one or more anomalies. For example, anomaly detection system 902 may use one or more processors to generate the alerts and may store the alerts in memory and/or other storage. At 1214, anomaly detection system 902 transmits the one or more alerts to an alert processing system. For example, anomaly detection system 902 may transmit the alerts over network 950 to alert processing system 906a or any other alert processing systems 906n.

Figure 13:
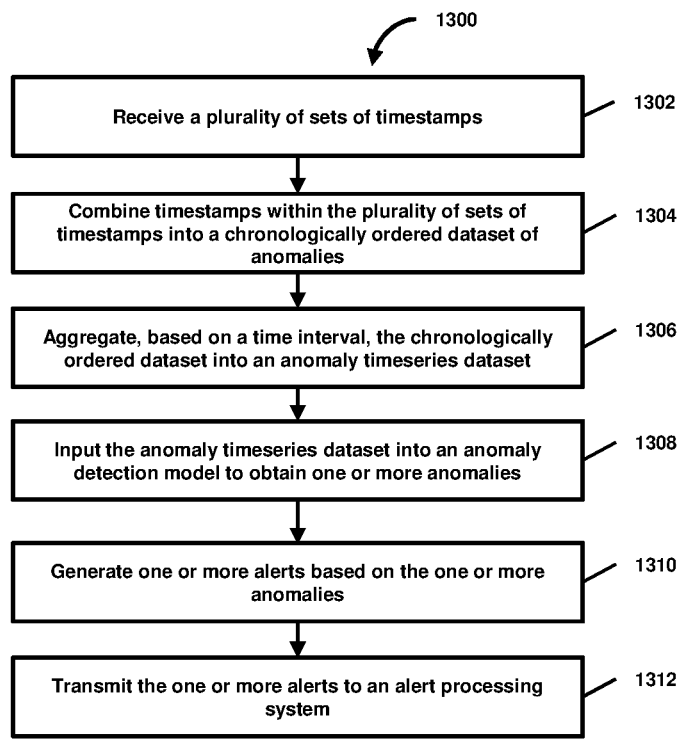
FIG. 13 illustrates another exemplary process for correlating events based on anomalies occurring within a given time interval across multiple timeseries datasets, in accordance with one or more embodiments of this disclosure.

FIG. 13 illustrates process 1300 for correlating events based on anomalies occurring within a given time interval across multiple timeseries datasets, in accordance with one or more embodiments of this disclosure. Process 1300 of FIG. 13 may be performed by anomaly detection system 902 of FIG. 9. At 1302, anomaly detection system 902 receives a plurality of sets of timestamps. The anomaly detection models may be hosted by data node 904, and/or anomaly detection system 902. Thus, the sets of timestamps may be received from data node 904 through network 950.

At 1304, anomaly detection system 902 combine timestamps within the plurality of sets of timestamps into a chronologically ordered dataset of anomalies. For example, anomaly detection system 902 may use one or more processors to perform the combining operation and store the resulting anomaly dataset in a memory and/or other storage. In some embodiments, as part of the combining operation, anomaly detection system 902 may sort the anomaly dataset into a chronologically ordered dataset. For example, anomaly detection system 902 may use one or more processors to perform the sorting operation and may store the result in memory and/or other storage.

At 1306, anomaly detection system 902 aggregates, based on a time interval, the chronologically ordered dataset into an anomaly timeseries dataset. For example, anomaly detection system 902 may use one or more processors to perform the aggregating operation and may store the result in memory and/or other storage. At 1308, anomaly detection system 902 inputs the anomaly timeseries dataset into an anomaly detection model to obtain one or more anomalies from the anomaly detection model. For example, the anomaly detection model may be hosted by anomaly detection system 902, thus the input operation may be performed locally on the system. In another example, the anomaly detection model may be hosted by data node 904. In this example, anomaly detection system 902 may transmit the anomaly timeseries dataset to data node 904 and receive from data node 904 the detected anomalies. In some embodiments, one or more anomaly detection model may be models as illustrated by FIG. 6 and the accompanying disclosure.

At 1310, anomaly detection system 902 generates one or more alerts based on the one or more anomalies. For example, anomaly detection system 902 may use one or more processors to generate the alerts and may store the alerts in memory and/or other storage. At 1312, anomaly detection system 902 transmits the one or more alerts to an alert processing system. For example, anomaly detection system 902 may transmit the alerts over network 950 to alert processing system 906a or any other alert processing systems 906n.

The present techniques will be better understood with reference to the following enumerated embodiments:

1. A method comprising: receiving a plurality of sets of timestamps, wherein each set of the plurality of sets timestamps includes one or more timestamps representing one or more anomalies detected within a corresponding timeseries dataset; combining timestamps within the plurality of sets of timestamps into a chronologically ordered dataset of anomalies; aggregating, based on a time interval, the chronologically ordered dataset into an anomaly timeseries dataset;

inputting the anomaly timeseries dataset into an anomaly detection model to obtain one or more anomalies; generating one or more alerts based on the one or more anomalies; and transmitting the one or more alerts to an alert processing system.

2. The method of any of the preceding embodiments, further comprising: receiving a plurality of timeseries datasets, wherein each timeseries dataset comprises a plurality of values for a plurality of timestamps; and inputting each of the plurality of timeseries datasets into one or more anomaly detection models.

3. The method of any of the preceding embodiments, wherein the plurality of timeseries datasets includes a first dataset comprising a first type of data and a second dataset comprising a second type of data.

4. The method of any of the preceding embodiments, wherein inputting each plurality of timeseries datasets into the one or more anomaly detection models comprises: selecting, based on the first type of data, a first anomaly detection model for the first dataset; selecting, based on the second type of data, a second anomaly detection model for the second dataset; and inputting the first dataset into the first anomaly detection model and inputting second dataset into the second anomaly detection model.

5. The method of any of the preceding embodiments, wherein combining the timestamps within the plurality of sets of timestamps into a chronologically ordered dataset of anomalies comprises: storing, in a data structure, a first set of the plurality of sets of timestamps in a chronological order; selecting, each set of the plurality of sets of timestamps; and placing each timestamp from the selected set into the data structure in the chronological order.

6. The method of any of the preceding embodiments, wherein aggregating, based on the time interval, the plurality of sets of timestamps into the anomaly timeseries dataset comprises: retrieving the time interval; retrieving, from the data structure, a time associated with a first timestamp stored in a first position within the data structure; traversing the data structure until a second timestamp is reached, wherein the second timestamp is the last timestamp within a timeslot associated with the first timestamp; and generating an aggregated value based on all the timestamps between the first timestamp and the second timestamp, wherein the aggregated value represents a count of anomalies detected between the first timestamp and the second timestamp.

7. The method of any of the preceding embodiments, further comprising: receiving, from the anomaly detection model and based on the anomaly timeseries dataset, one or more probabilities corresponding to the one or more anomalies detected by the anomaly detection model; retrieving an anomaly confidence threshold; and removing from the one or more anomalies those anomalies that do not meet the anomaly confidence threshold.

8. A tangible, non-transitory, machine-readable medium storing instructions that, when executed by a data processing apparatus, cause the data processing apparatus to perform operations comprising any of those in embodiments 1-7.

9. A system comprising: one or more processors; and memory storing instructions that, when executed by the processors, cause the processors to effectuate operations comprising any of those in embodiments 1-7.

10. A system comprising means for performing any of embodiments 1-7.

11. A system comprising cloud-based circuitry for performing any of embodiments 1-7.

Anomaly Detection in a Split Timeseries Dataset

Another way to improve anomaly detection is to divide a received dataset into multiple datasets based on a type of anomaly detection requested before submitting the datasets to anomaly detection models. For example, it may be desirable to execute anomaly detection on a dataset that includes a multitude of security log data from various computing systems within a datacenter. However, the dataset may be large and include a large number of entries which may make it very difficult or impossible to detect specific anomalies. For example, a user (e.g., a security officer) may want to execute anomaly detection based on user login information. That is, the security office may want to determine whether one or more users have been accessing/copying/downloading data at an anomalous rate. In another example, a user may want to determine whether one or more specific computing systems have had anomalous login/processing or other activity recorded. Thus, the user is enabled to provide an attribute for the anomalous activity detection that may be used to split/divide a dataset for appropriate anomaly detection.

System 900 of FIG. 9 may be used to perform the operations for improving detection of anomalous activity by dividing a dataset into multiple datasets based on the type of anomaly detection requested. Anomaly detection system 902 may receive (e.g., via communication subsystem 912) a request to detect anomalous activity. The request may include a data attribute. For example, the data attribute may be a field or multiple fields in a dataset. Anomaly detection system 902 may retrieve the field from the request.

Anomaly detection system 902 may receive (e.g., via communication subsystem 912) a dataset including event data for a plurality of events. The event data may include a plurality of fields with a timestamp field and a plurality of attribute fields. FIG. 14 shows table 1400 that illustrates fields of a dataset of system log entries. Table 1400 includes rows 1402 that represent system log entries. Table 1400 may include many entries (e.g., millions of entries) from one or multiple systems. Field 1404 stores timestamps for the system events in the dataset, while field 1406 may store usernames and field 1408 may store an action associated with a particular entry. Each entry may include other fields with other information. A person skilled in the art would understand that table 1400 may store different data (e.g., transaction data, record data, or other type of data).

When the request and/or the dataset are received using communication subsystem 912, that data may be passed to dataset processing subsystem 914. Anomaly detection system 902 (e.g., using dataset processing subsystem 914) may compare the data attribute with each field of the plurality of attribute fields. For example, dataset processing subsystem 914 may iterate through each field name in the dataset and compare the data attribute with each field to identify a field that matches the request. In some embodiments, the data attribute may correspond to multiple fields. For example, FIG. 14 includes a user field (e.g., field 1406) and an action field (e.g., field 1408), thus the attribute may be unique combinations of user and action fields.

In some embodiments, anomaly detection system 902 may receive the dataset and identify the different fields in the dataset. The anomaly detection system may generate an interface that enables a user to select one or more fields detected in the dataset. The interface may be presented to the user through, for example, a webpage, an application, or another suitable method. When the user selection is received, the dividing attribute may be determined by comparing the received one or more selections with all the field names.

Thus, anomaly detection system 902 may determine (e.g., via dataset processing subsystem 914), based on the comparing, a dividing attribute for the dataset. To continue with the example in FIG. 14, the dividing attribute may be a user, a system, or any other suitable attribute. In some embodiments, the dividing attribute may be a combination of fields. As discussed above, the dividing attribute may be a combination of user and action fields.

Anomaly detection system 902 may divide (e.g., via dataset processing subsystem 914), based on the dividing attribute, the dataset into a plurality of datasets. For example, the anomaly detection system may access the dataset and determine unique values in a field corresponding to the dividing attribute. Anomaly detection system 902 may then generate a data structure for each unique value and copy entries associated with each unique value to the corresponding data structure. For example, field 1406 of FIG. 14 may be the dividing attribute. Anomaly detection system may iterate through field 1406 to determine unique users in the dataset and generate one data structure per unique user. The anomaly detection system may then iterate through the dataset and identify a user in each entry, then copy that entry to the appropriate data structure based on the user.

In some embodiments, the anomaly detection system may perform a single iteration through the dataset to divide the dataset into multiple datasets. The anomaly detection system may iterate through each entry and determine if the value in the field corresponding to the dividing attribute was encountered in a previous entry. If it has been encountered, the anomaly detection system may determine the appropriate data structure for the entry, and may copy the entry into that data structure. If the value has not been encountered before, the anomaly detection system may generate a new data structure for entries having that value.

In some embodiments, the dividing attribute may be multiple fields, thus the anomaly detection system may generate one data structure for a unique combination of the values in the dividing fields. For example, for a portion of the dataset illustrated in FIG. 14, there may be two data structures. One may correspond to the combination of User1-System1 values and the other may correspond to User2-System2 values. To generate the datasets, the anomaly detection system may iterate through each entry and determine if the combination of values in the fields corresponding to the dividing attribute was encountered in a previous entry. If it has been encountered, the anomaly detection system may determine the appropriate data structure for the entry, and may copy the entry into that data structure. If the combination of values has not been encountered before, the anomaly detection system may generate a new data structure for entries having that combination of values.

When each dataset is ready, anomaly detection system 902 may aggregate, based on a time interval, the plurality of datasets into a plurality of timeseries datasets. Each anomaly timeseries dataset may include a plurality of timestamps. In some embodiments, dataset processing subsystem 914 may perform the following operations to perform the aggregation of each timeseries dataset. Dataset processing subsystem 914 may retrieve the time interval. For example, the time interval may be one minute, one hour, one day, or another suitable time interval. Dataset processing subsystem 914 may retrieve the time interval from memory or from another suitable location.

Furthermore, dataset processing subsystem 914 may retrieve, from the chronologically ordered dataset, a time associated with a first timestamp stored in a first position within the chronologically ordered dataset. For example, dataset processing subsystem 914 may access a data structure that stores the chronologically ordered dataset and retrieve the earliest entry (i.e., the first entry) in the dataset. In some embodiments, dataset processing subsystem 914 may determine a timeslot associated with the first timestamp. For example, if the time interval is one hour and the timestamp is 2021-01-01 01:11:00, dataset processing subsystem 914 may determine that the timeslot for the entry is between 1 PM and 2 PM on Jan. 1, 2021. The determination may be performed by adding the time interval to the timestamp and rounding down to the nearest period (e.g., nearest hour) and subtracting the time interval from the timestamp and rounding up the timestamp to the nearest period (e.g., nearest hour).

Dataset processing subsystem 914 may then traverse the chronologically ordered dataset until a second timestamp is reached which is the last timestamp within a timeslot associated with the first timestamp. For example, dataset processing subsystem 914 may iterate through each timestamp and compare each timestamp with the timeslot ending time. The process may proceed until a timestamp is after the ending time and then stop.

Dataset processing subsystem 914 may generate an aggregated value based on all the timestamps starting from the first timestamp and ending with a last timestamp prior to the second timestamp such that the aggregated value represents a count of anomalies detected starting with the first timestamp and ending with the second timestamp. For example, dataset processing subsystem 914 may add all the timestamps to arrive at the aggregated value for the specific timeslot.

As discussed above, dataset processing subsystem 914 may aggregate the data based on an hourly interval. FIG. 11 illustrates table 1100 that includes timeslots and corresponding number of anomalies. Column 1102 includes timeslots 1106 and 1108, while column 1104 includes a number of anomalies detected in those timeslots.

Dataset processing subsystem 914 may input the plurality of timeseries datasets into a plurality of anomaly detection models to obtain a plurality of sets of anomalies. In some embodiments, the anomaly detection model may be a model as illustrated by FIG. 6 and the accompanying disclosure. For example, the output of the anomaly detection model may be timestamps or timeslots and for each a probability or a score that the particular timestamp or timeslot is associated with a value indicating an anomaly. For each timeseries dataset there may be multiple anomalies, or no anomalies detected. In some embodiments, dataset processing subsystem 914 may determine which timestamps are associated with anomalies based on a threshold probability or score value. That is, if the associated probability or score is higher than the threshold, dataset processing subsystem 914 may identify a particular timestamp as an anomaly. For example, dataset processing subsystem 914 may receive, from the anomaly detection model and based on the anomaly timeseries dataset, one or more probabilities corresponding to the one or more anomalies detected by the anomaly detection model, and retrieve an anomaly confidence threshold. The anomaly confidence value may be a threshold probability or a threshold score that determines whether a given probability corresponds to a positive detection of an anomaly.

When the anomalies are received, dataset processing subsystem 914 may generate an anomaly timeseries dataset from the plurality of sets of anomalies. For example, the data processing subsystem may generate a data structure for the anomaly timeseries dataset and store, in that data structure, a first set of the plurality of sets of timestamps in chronological order. The dataset processing subsystem may then iterate through each set of anomalies and select each set in parallel, or sequentially, and place each timestamp from each selected set of anomalies into the data structure in the chronological order to generate a chronologically ordered dataset. For example, the dataset processing subsystem may select each timestamp in each set and iterate through the data structure until the proper chronological place, based on the timestamp, is located within the data structure. The data processing subsystem may then insert the timestamp into the data structure.

In some embodiments, the anomaly timeseries dataset may be aggregated based on an aggregation time interval. Dataset processing subsystem 914 may retrieve the aggregation time interval. For example, the aggregation time interval may be one minute, one hour, one day, or another suitable time interval. Dataset processing subsystem 914 may retrieve the aggregation time interval from memory or from another suitable location.

Furthermore, dataset processing subsystem 914 may retrieve, from the chronologically ordered dataset, a time associated with a first timestamp stored in a first position within the chronologically ordered dataset. For example, dataset processing subsystem 914 may access a data structure that stores the chronologically ordered dataset and retrieve the earliest entry (i.e., the first entry) in the dataset. In some embodiments, dataset processing subsystem 914 may determine a timeslot associated with the first timestamp. For example, if the aggregation time interval is one hour and the timestamp is 2021-01-01 01:11:00, dataset processing subsystem 914 may determine that the timeslot for the entry is between 1 PM and 2 PM on Jan. 1, 2021. The determination may be performed adding the aggregation time interval to the timestamp and rounding down to the nearest interval (e.g., nearest hour) and subtracting the aggregation time interval from the timestamp and rounding up the timestamp to the nearest interval (e.g., nearest hour).

Dataset processing subsystem 914 may then traverse the chronologically ordered dataset until a second timestamp is reached. The second timestamp may be the last timestamp within a timeslot associated with the first timestamp. For example, dataset processing subsystem 914 may iterate through each timestamp and compare each timestamp with the timeslot ending time. The process may proceed until a timestamp is after the ending time is reached and then stop.

Dataset processing subsystem 914 may generate an aggregated value based on all the timestamps starting from the first timestamp and ending with a last timestamp prior to the second timestamp. The aggregated value may represent a count of anomalies detected starting with the first timestamp and ending with the second timestamp. For example, dataset processing subsystem 914 may add all the timestamps to arrive at the aggregated value for the specific timeslot.

As discussed above, dataset processing subsystem 914 may aggregate the data based on an hourly interval. FIG. 11 illustrates table 1100 which includes timeslots and corresponding number of anomalies. Column 1102 includes timeslots 1106 and 1108, while column 1104 includes a number of anomalies detected in those timeslots.

Dataset processing subsystem 914 may input the anomaly timeseries dataset into an anomaly detection model to obtain one or more anomalies. In some embodiments, the anomaly detection model may be a model as illustrated by FIG. 6 and the accompanying disclosure. For example, the output of the anomaly detection model may be timestamps or timeslots and for each a probability or a score that the particular timestamp or timeslot is associated with a value indicating an anomaly. For each timeseries dataset there may be multiple anomalies, or no anomalies detected. In some embodiments, dataset processing subsystem 914 may determine which timestamps are associated with anomalies based on a threshold probability or score value. That is, if the associated probability or score is higher than the threshold, dataset processing subsystem 914 may identify a particular timestamp as an anomaly. For example, dataset processing subsystem 914 may receive, from the anomaly detection model and based on the anomaly timeseries dataset, one or more probabilities corresponding to the one or more anomalies detected by the anomaly detection model, and retrieve an anomaly confidence threshold. The anomaly confidence value may be a threshold probability or a threshold score that determines whether a given probability corresponds to a positive detection of an anomaly.

Dataset processing subsystem 914 may remove from the one or more anomalies those anomalies that do not meet the anomaly confidence threshold.

Alerting subsystem 918 may generate one or more alerts based on the one or more anomalies, and transmit the one or more alerts to an alert processing system. For example, alerting subsystem 918 may generate one alert for each detected anomaly. The alert may include timeseries data associated with the timestamp for which the anomaly was detected. In some embodiments, alerting subsystem 918 may generate one alert for all the detected anomalies and include the timeseries data associated with each timestamp. When the alert or alerts are generated, alerting subsystem 918 may pass the alert or alerts to communication subsystem 912. Communication subsystem 912 may transmit (e.g., via network 950) the alert or alerts to an appropriate alert processing system (e.g., alert processing system 106*a*).

Figure 15:
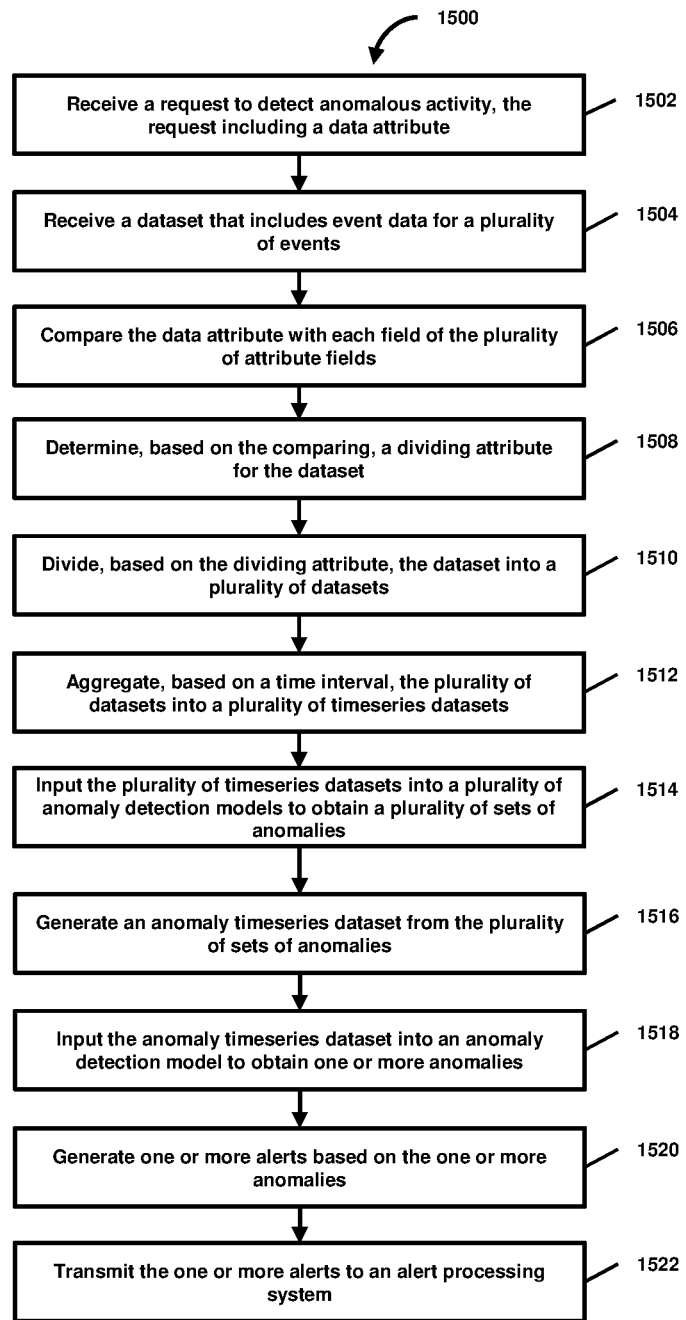
FIG. 15 illustrates an exemplary process for improving detection of anomalous activity, in accordance with one or more embodiments of this disclosure.

FIG. 15 illustrates an exemplary process 1500 for improving detection of anomalous activity, in accordance with one or more embodiments of this disclosure. At 1502, anomaly detection system 902 receives a request to detect anomalous activity. The request may include a data attribute. Anomaly detection system 902 may receive the request from a client (not shown) or from another source (e.g., data node 904 or alert processing system 906*a*). At 1504, anomaly detection system 902 receives a dataset that includes event data for a plurality of events. The event data may include a plurality of fields including a timestamp field and a plurality of attribute fields. Anomaly detection system 902 may receive the dataset from a client (not shown) or from another source (e.g., data node 904 or alert processing system 906*a*).

At 1506, anomaly detection system 902 compares the data attribute with each field of the plurality of attribute fields. For example, the anomaly detection system may use one or more processors to perform the comparison. At 1508, anomaly detection system 902 determines, based on the comparing, a dividing attribute for the dataset. For example, the anomaly detection system may use one or more processors to perform the determination.

At 1510, anomaly detection system 902 divides, based on the dividing attribute, the dataset into a plurality of datasets. For example, the anomaly detection system may use one or more processors to perform the division, and store the resulting datasets in memory and/or other storage. At 1512, anomaly detection system 902 aggregates, based on a time interval, the plurality of datasets into a plurality of timeseries datasets. The anomaly detection system may perform the aggregation using one or more processors and store the resulting datasets in memory and/or other storage. At 1514, anomaly detection system 902, inputs the plurality of timeseries datasets into a plurality of anomaly detection models to obtain a plurality of sets of anomalies. The anomaly detection system may perform the input using one or more processors and store the resulting output in memory and/or other storage.

At 1516, anomaly detection system 902 generates an anomaly timeseries dataset from the plurality of sets of anomalies. The anomaly detection system may perform the generation using one or more processors and may store the resulting anomaly timeseries dataset in memory and/or storage. At 1518, anomaly detection system 902 inputs the anomaly timeseries dataset into an anomaly detection model to obtain one or more anomalies. The anomaly detection system may perform the input using one or more processors and store the resulting output in memory and/or other storage.

At 1520, anomaly detection system 902 generates one or more alerts based on the one or more anomalies. The anomaly detection system may generate the alerts using one or more processors and store the alerts in memory and/or other storage. At 1522, anomaly detection system 902 transmits the one or more alerts to an alert processing system. For example, the anomaly detection system may transmit the alerts to one or more alter processing systems 906a-906n.

Figure 16:
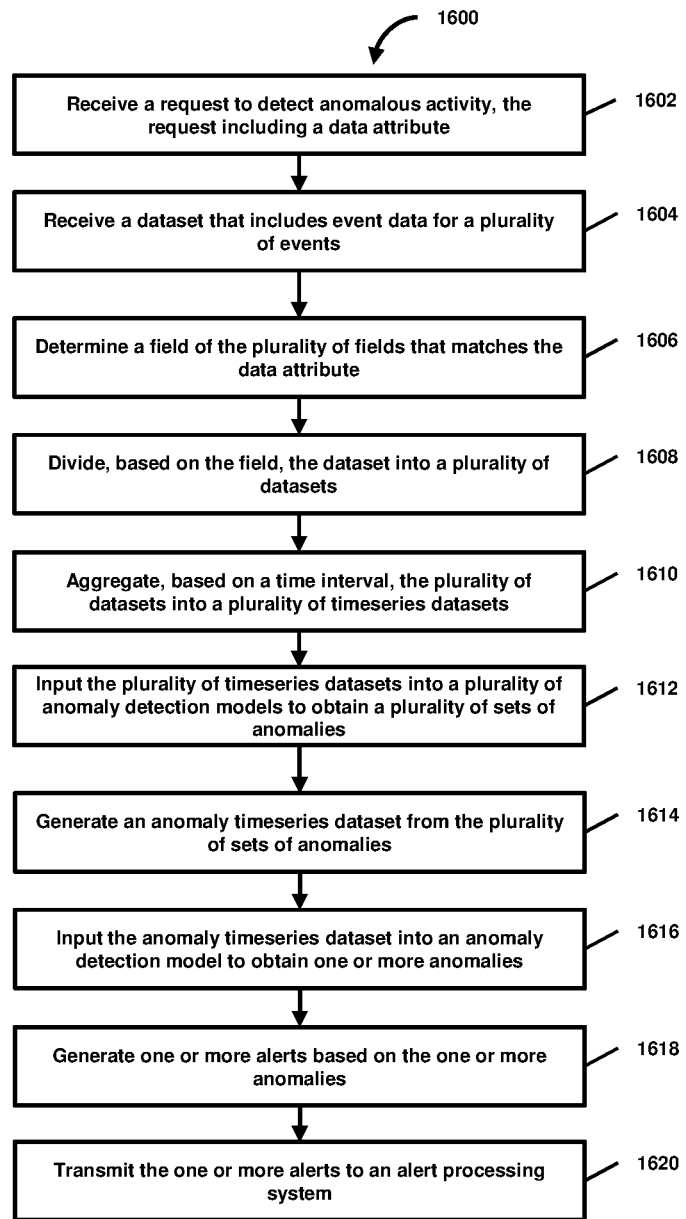
FIG. 16 illustrates another exemplary process for improving detection of anomalous activity, in accordance with one or more embodiments of this disclosure.

FIG. 16 illustrates another exemplary process 1600 for improving detection of anomalous activity, in accordance with one or more embodiments of this disclosure. At 1602, anomaly detection system 902 receives a request to detect anomalous activity. The request may include a data attribute. Anomaly detection system 902 may receive the request from a client (not shown) or from another source (e.g., data node 904 or alert processing system 906a). At 1604, anomaly detection system 902 receives a dataset that includes event data for a plurality of events. Anomaly detection system 902 may receive the dataset from a client (not shown) or from another source (e.g., data node 904 or alert processing system 906a).

At 1606, anomaly detection system 902 determines a field of the plurality of fields that matches the data attribute. For example, the anomaly detection system may use one or more processors to perform the determination. At 1608, anomaly detection system 902 divides, based on the field, the dataset into a plurality of datasets. For example, the anomaly detection system may use one or more processors to perform the division, and store the resulting datasets in memory and/or other storage. At 1610, anomaly detection system 902 aggregates, based on a time interval, the plurality of datasets into a plurality of timeseries datasets. The anomaly detection system may perform the aggregation using one or more processors and store the resulting datasets in memory and/or other storage. At 1612, anomaly detection system 902, inputs the plurality of timeseries datasets into a plurality of anomaly detection models to obtain a plurality of sets of anomalies. The anomaly detection system may perform the input using one or more processors and store the resulting output in memory and/or other storage.

At 1614, anomaly detection system 902 generates an anomaly timeseries dataset from the plurality of sets of anomalies. The anomaly detection system may perform the generation using one or more processors and may store the resulting anomaly timeseries dataset in memory and/or storage. At 1616, anomaly detection system 902 inputs the anomaly timeseries dataset into an anomaly detection model to obtain one or more anomalies. The anomaly detection system may perform the input using one or more processors and store the resulting output in memory and/or other storage.

At 1618, anomaly detection system 902 generates one or more alerts based on the one or more anomalies. The anomaly detection system may generate the alerts using one or more processors and store the alerts in memory and/or other storage. At 1620, anomaly detection system 902 transmits the one or more alerts to an alert processing system. For example, the anomaly detection system may transmit the alerts to one or more alert processing systems 906a-906n.

The present techniques will be better understood with reference to the following enumerated embodiments:

1. A method comprising: receiving a request to detect anomalous activity, the request comprising a data attribute; receiving a dataset comprising event data for a plurality of events, wherein the event data comprises a plurality of fields; determining a field of the plurality of fields that matches the data attribute; dividing, based the field, the dataset into a plurality of datasets; aggregating, based on a time interval, the plurality of datasets into a plurality of timeseries datasets; inputting the plurality of timeseries datasets into one or more anomaly detection models to obtain one or more sets of anomalies; generating an anomaly timeseries dataset from the one or more sets of anomalies; inputting the anomaly timeseries dataset into an anomaly detection model to obtain one or more anomalies; generating one or more alerts based on the one or more anomalies; and transmitting the one or more alerts to an alert processing system.

2. The method of any of the preceding embodiments, wherein a plurality of fields includes a timestamp field, a value field, and a plurality of attribute fields.

3. The method of any of the preceding embodiments, wherein determining the field of the plurality of fields that matches the data attribute comprises: comparing the data attribute with each field of the plurality of fields; and determining, based on the comparing, the field of the plurality fields.

4. The method of any of the preceding embodiments, wherein the plurality of datasets includes a first dataset comprising a first type of data and a second dataset comprising a second type of data.

5. The method of any of the preceding embodiments, wherein inputting each of the plurality of datasets into the one or more anomaly detection models comprises: selecting, based on the first type of data, a first anomaly detection model for the first dataset; selecting, based on the second type of data, a second anomaly detection model for the second dataset; and inputting the first dataset into the first anomaly detection model and inputting the second dataset into the second anomaly detection model.

6. The method of any of the preceding embodiments, wherein generating the anomaly timeseries dataset from the plurality of sets of anomalies comprises: storing, in a data structure, a first set of the plurality of sets of timestamps in a chronological order; selecting, each set of the plurality of sets of anomalies; and placing each timestamp from each selected set of anomalies into the data structure in the chronological order to generate a chronologically ordered dataset.

7. The method of any of the preceding embodiments, wherein generating the anomaly timeseries dataset from the plurality of sets of anomalies comprises: retrieving an aggregation time interval; retrieving, from the chronologically ordered dataset, a time associated with a first timestamp stored in a first position within the chronologically ordered dataset; traversing the chronologically ordered dataset until a second timestamp is reached wherein the second timestamp is the last timestamp within a timeslot associated with the first timestamp; and generating an aggregated value based on all the timestamps starting from the first timestamp and ending with the second timestamp, wherein the aggregated value represents a count of anomalies detected starting with the first timestamp and ending with the second timestamp.

8. The method of any of the preceding embodiments, further comprising: receiving, from the anomaly detection model and based on the anomaly timeseries dataset, one or more probabilities corresponding to the one or more anomalies detected by the anomaly detection model; retrieving an anomaly confidence threshold; and removing from the one or more anomalies those anomalies that do not meet the anomaly confidence threshold.

9. A tangible, non-transitory, machine-readable medium storing instructions that, when executed by a data processing apparatus, cause the data processing apparatus to perform operations comprising any of those in embodiments 1-8.

10. A system comprising: one or more processors; and memory storing instructions that, when executed by the processors, cause the processors to effectuate operations comprising any of those in embodiments 1-8.

11. A system comprising means for performing any of embodiments 1-8.

12. A system comprising cloud-based circuitry for performing any of embodiments 1-8.

Computing Environment

Figure 17:
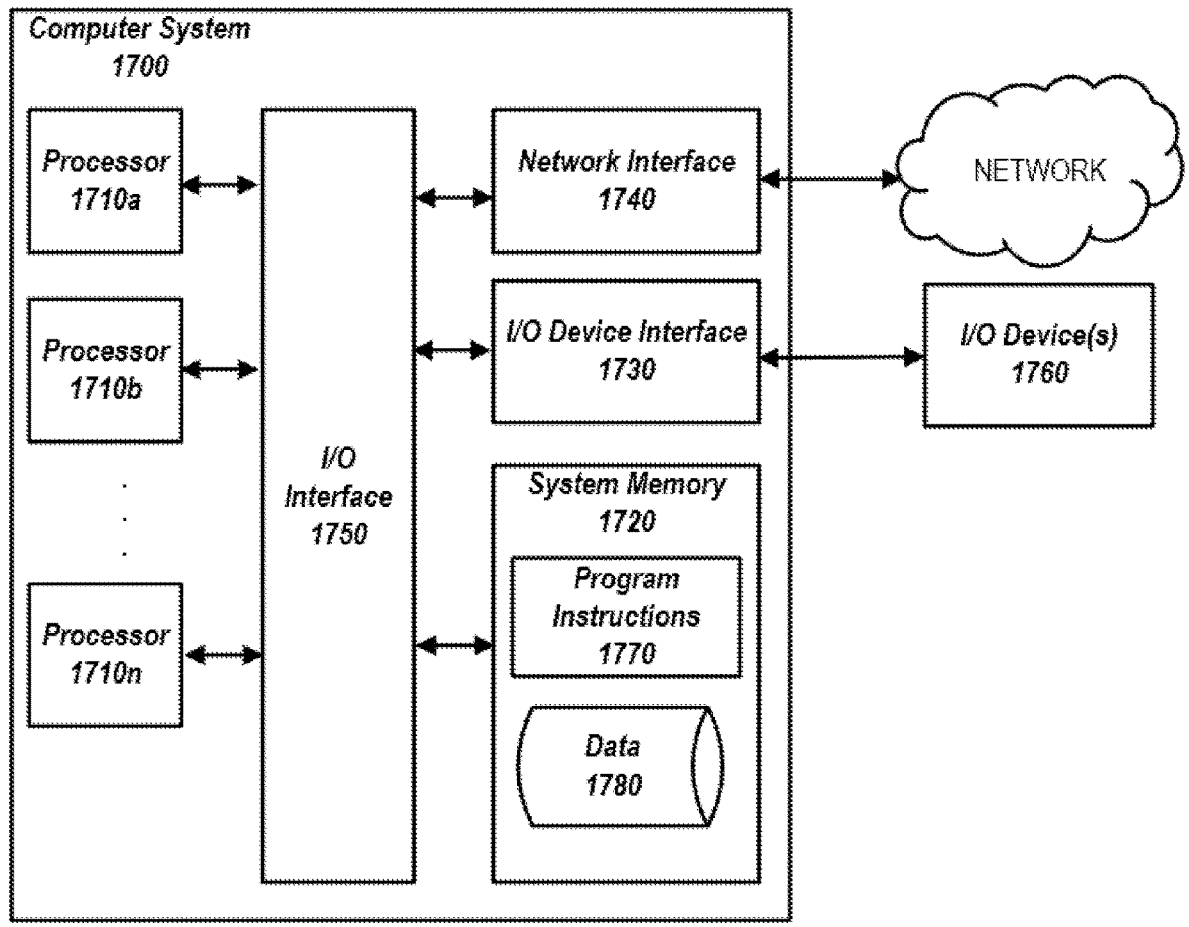
FIG. 17 illustrates a computing system that may perform actions, in accordance with some embodiments of this disclosure.

FIG. 17 shows an example computing system that may be used in accordance with some embodiments. In some instances, computing system 1700 is referred to as a computer system. A person skilled in the art would understand that those terms may be used interchangeably. The components of FIG. 17 may be used to perform some or all operations discussed in relation with FIGS. 1-16. For example, operations discussed in relation to FIGS. 7-8, 12-13, and 15-16 may be performed by processors 1710a-1710n illustrated in FIG. 17 and results stored in system memory 1720. Furthermore, various portions of systems and methods described herein may include or be executed on one or more computer systems similar to computing system 1700. Further, processes and modules described herein may be executed by one or more processing systems similar to that of computing system 1700.

Computing system 1700 may include one or more processors (e.g., processors 1710a-1710n) coupled to system memory 1720, an input/output I/O device interface 1730, and a network interface 1740 via an input/output (I/O) interface 1750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1720). Computing system 1700 may be a uni-processor system including one processor (e.g., processor 1710a), or a multi-processor system including any number of suitable processors (e.g., 1710a-1710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1700 may include a plurality of computing devices (e.g., distributed computer systems) to implement various processing functions.

I/O device interface 1730 may provide an interface for connection of one or more I/O devices 1760 to computer system 1700. I/O devices may include devices that receive input (e.g., from a user) or output information (e.g., to a user). I/O devices 1760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1760 may be connected to computer system 1700 through a wired or wireless connection. I/O devices 1760 may be connected to computer system 1700 from a remote location. I/O devices 1760 located on remote computer system, for example, may be connected to computer system 1700 via a network and network interface 1740.

Network interface 1740 may include a network adapter that provides for connection of computer system 1700 to a network. Network interface 1740 may facilitate data exchange between computer system 1700 and other devices connected to the network. Network interface 1740 may support wired or wireless communication. The network may include an electronic communication network, such as the Internet, a local area network (LAN), a wide area network (WAN), a cellular communications network, or the like.

System memory 1720 may be configured to store program instructions 1770 or data 1780. Program instructions 1770 may be executable by a processor (e.g., one or more of processors 1710a-1710n) to implement one or more embodiments of the present techniques. Instructions 1770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1720 may include a non-transitory computer readable storage medium that may have program instructions stored thereon that are executable by a computer processor (e.g., one or more of processors 1710a-1710n) to cause the subject matter and the functional operations described herein. A memory (e.g., system memory 1720) may include a single memory device and/or a plurality of memory devices (e.g., distributed memory devices).

I/O interface 1750 may be configured to coordinate I/O traffic between processors 1710a-1710n, system memory 1720, network interface 1740, I/O devices 1760, and/or other peripheral devices. I/O interface 1750 may perform protocol, timing, or other data transformations to convert data signals from one component (e.g., system memory 1720) into a format suitable for use by another component (e.g., processors 1710a-1710n). I/O interface 1750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1700 or multiple computer systems 1700 configured to host different portions or instances of embodiments. Multiple computer systems 1700 may provide for parallel or sequential processing/execution of one or more portions of the techniques described herein.

Those skilled in the art will appreciate that computer system 1700 is merely illustrative and is not intended to limit the scope of the techniques described herein. Computer system 1700 may include any combination of devices or software that may perform or otherwise provide for the performance of the techniques described herein. For example, computer system 1700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A system for correlating events based on multiple anomalies occurring within a given time interval across multiple timeseries datasets, the system comprising:
   one or more processors; and
   a non-transitory computer-readable storage medium storing instructions, which when executed by the one or more processors cause the one or more processors to:
      receive, from a plurality of anomaly detection models trained to detect anomalies within different types of data, a plurality of sets of timestamps, wherein each timestamp within each set represents an anomaly detected within a corresponding timeseries dataset of a plurality of timeseries datasets, and wherein a time period of each timeseries dataset matches the time period of each other dataset in the plurality of timeseries datasets;
      combine timestamps representing the anomalies within the plurality of sets of timestamps into an anomaly dataset;
      sort the anomaly dataset into a chronologically ordered dataset;
      transform, based on a time interval using a transformation function, the chronologically ordered dataset into an anomaly timeseries dataset, wherein the anomaly timeseries dataset comprises an aggregated value representing timestamps for each time interval of the time period;

input the anomaly timeseries dataset into an anomaly detection model trained to detect the anomalies within anomaly timeseries datasets to obtain one or more anomalies from the anomaly detection model, wherein the anomaly detection model is not one of the plurality of anomaly detection models trained to detect the anomalies within the different types of data;

generate one or more alerts based on the one or more anomalies; and transmit the one or more alerts to an alert processing system.

2. The system of claim 1, further comprising instructions that cause the one or more processors to:

receive the plurality of timeseries datasets, wherein each timeseries dataset of the plurality of timeseries datasets comprises a plurality of values for a plurality of timestamps, and wherein the plurality of timeseries datasets includes a first dataset comprising a first type of data and a second dataset comprising a second type of data; and obtain the plurality of sets of timestamps by inputting each of the plurality of timeseries datasets into one or more anomaly detection models of the plurality of anomaly detection models trained to detect the anomalies within the different types of data, wherein each set of the plurality of sets of timestamps comprises one or more timestamps representing the one or more anomalies detected within the corresponding timeseries dataset.

3. The system of claim 2, wherein the instructions that cause the one or more processors to input each of the plurality of timeseries datasets into the one or more anomaly detection models further cause the one or more processors to:

select, based on the first type of data, a first anomaly detection model for the first dataset, wherein the first anomaly detection model is one of the plurality of anomaly detection models trained to detect the anomalies within the different types of data;

select, based on the second type of data, a second anomaly detection model for the second dataset, wherein the second anomaly detection model is one of the plurality of anomaly detection models trained to detect the anomalies within the different types of data; and input the first dataset into the first anomaly detection model and input the second dataset into the second anomaly detection model.

4. The system of claim 1, wherein the instructions that cause the one or more processors to transform the chronologically ordered dataset into the anomaly timeseries dataset further cause the one or more processors to:

retrieve the time interval;

retrieve, from the chronologically ordered dataset, a time associated with a first timestamp stored in a first position within the chronologically ordered dataset;

traverse the chronologically ordered dataset until a second timestamp is reached, wherein the second timestamp is a last timestamp within a time slot associated with the first timestamp; and generating first aggregated value based on all the timestamps starting from the first timestamp and ending with the second timestamp, wherein the aggregated value represents a count of the anomalies detected starting with the first timestamp and ending with the second timestamp.

5. The system of claim 1, further comprising instructions that cause the one or more processors to:

receive, from the anomaly detection model and based on the anomaly timeseries dataset, one or more probabilities corresponding to the one or more anomalies detected by the anomaly detection model;

retrieve an anomaly confidence threshold; and remove from the one or more anomalies those anomalies that do not meet the anomaly confidence threshold.

6. A method comprising:

receiving a plurality of sets of timestamps, wherein each set of the plurality of sets of timestamps includes a plurality of timestamps, each timestamp representing an anomaly detected within a corresponding timeseries dataset by a corresponding anomaly detection model of a plurality of anomaly detection models trained to detect anomalies within different types of data, and wherein a time period for each set of the plurality of sets of timestamps matches the time period for each other set of the plurality of sets of timestamps;

combining timestamps within the plurality of sets of timestamps into a chronologically ordered dataset of anomalies;

transforming, based on a time interval using a transformation function, the chronologically ordered dataset into an anomaly timeseries dataset having an aggregated value representing timestamps for each time interval of the time period;

inputting the anomaly timeseries dataset into an anomaly detection model trained to detect the anomalies in anomaly timeseries datasets to obtain one or more anomalies, wherein the anomaly detection model is not one of the plurality of anomaly detection models trained to detect the anomalies within the different types of data;

generating one or more alerts based on the one or more anomalies; and transmitting the one or more alerts to an alert processing system.

7. The method of claim 6, further comprising:

receiving a plurality of timeseries datasets, wherein each timeseries dataset comprises a plurality of values; and inputting each of the plurality of timeseries datasets into the plurality of anomaly detection models.

8. The method of claim 7, wherein the plurality of timeseries datasets includes a first dataset comprising a first type of data and a second dataset comprising a second type of data.

9. The method of claim 8, wherein inputting each of the plurality of timeseries datasets into the plurality of anomaly detection models trained to detect the anomalies within the different types of data comprises:

selecting, based on the first type of data, a first anomaly detection model for the first dataset, wherein the first anomaly detection model is one of the plurality of anomaly detection models trained to detect the anomalies within the different types of data;

selecting, based on the second type of data, a second anomaly detection model for the second dataset, wherein the second anomaly detection model is one of the plurality of anomaly detection models trained to detect the anomalies within the different types of data; and inputting the first dataset into the first anomaly detection model and inputting the second dataset into the second anomaly detection model.

10. The method of claim 6, wherein combining the timestamps within the plurality of sets of timestamps into the chronologically ordered dataset of the anomalies comprises:
   storing, in a data structure, a first set of the plurality of sets of timestamps in a chronological order;
   selecting, each set of the plurality of sets of timestamps; and
   placing each timestamp from each selected set into the data structure in the chronological order.

11. The method of claim 10, wherein transforming the plurality of sets of timestamps into the anomaly timeseries dataset comprises:
   retrieving the time interval;
   retrieving, from the data structure, a time associated with a first timestamp stored in a first position within the data structure;
   traversing the data structure until a second timestamp is reached, wherein the second timestamp is a last timestamp within a time slot associated with the first timestamp; and
   generating a first aggregated value based on all the timestamps between the first timestamp and the second timestamp, wherein the aggregated value represents a count of the anomalies detected between the first timestamp and the second timestamp.

12. The method of claim 6, further comprising:
   receiving, from the anomaly detection model and based on the anomaly timeseries dataset, one or more probabilities corresponding to the one or more anomalies detected by the anomaly detection model;
   retrieving an anomaly confidence threshold; and
   removing from the one or more anomalies those anomalies that do not meet the anomaly confidence threshold.

13. A non-transitory, computer-readable medium for correlating events based on anomalies occurring within a given time interval across multiple timeseries datasets, storing instructions that, when executed by one or more processors, cause operations comprising:
   receiving a plurality of sets of timestamps, wherein each set of the plurality of sets of timestamps includes one or more timestamps, each timestamp representing an anomaly detected within a corresponding timeseries dataset by a corresponding anomaly detection model of a plurality of anomaly detection models trained to detect anomalies within different types of data, and wherein a time period for each set of the plurality of sets of timestamps matches the time period for each other set of the plurality of sets of timestamps;
   combining timestamps within the plurality of sets of timestamps into a chronologically ordered dataset of the anomalies;
   transforming, based on a time interval using a transformation function, the chronologically ordered dataset into an anomaly timeseries dataset having an aggregated value representing timestamps for each time interval of the time period;
   inputting the anomaly timeseries dataset into an anomaly detection model trained to detect the anomalies in anomaly timeseries datasets to obtain one or more anomalies, wherein the anomaly detection model is not one of the plurality of anomaly detection models trained to detect the anomalies within the different types of data;
   generating one or more alerts based on the one or more anomalies; and
   transmitting the one or more alerts to an alert processing system.

14. The non-transitory, computer-readable medium of claim 13, wherein the instructions further cause one or more processors to:
   receive a plurality of timeseries datasets, wherein each timeseries dataset comprises a plurality of values for a plurality of timestamps; and
   input each of the plurality of timeseries datasets into the plurality of one or mom anomaly detection models.

15. The non-transitory, computer-readable medium of claim 14, wherein the plurality of timeseries datasets includes a first dataset comprising a first type of data and a second dataset comprising a second type of data.

16. The non-transitory, computer-readable medium of claim 15, wherein the instructions that cause the one or more processors to input each of the plurality of timeseries datasets into the plurality of anomaly detection models trained to detect the anomalies within the different types of data further cause the one or more processors to:
   select, based on the first type of data, a first anomaly detection model for the first dataset, wherein the first anomaly detection model is one of the plurality of anomaly detection models trained to detect the anomalies within the different types of data;
   select, based on the second type of data, a second anomaly detection model for the second dataset, wherein the first anomaly detection model is one of the plurality of anomaly detection models trained to detect the anomalies within the different types of data; and
   input the first dataset into the first anomaly detection model and input the second dataset into the second anomaly detection model.

17. The non-transitory, computer-readable medium of claim 13, wherein the instructions that cause the one or more processors to combine the timestamps within the plurality of sets of timestamps into the chronologically ordered dataset of the anomalies further cause the one or more processors to:
   store, in a data structure, a first set of the plurality of sets of timestamps in a chronological order;
   select, each set of the plurality of sets of timestamps; and
   place each timestamp from each selected set into the data structure in the chronological order.

18. The non-transitory, computer-readable medium of claim 17, wherein the instructions that cause the one or more processors to transform the plurality of sets of timestamps into the anomaly timeseries dataset further cause the one or more processors to:
   retrieve the time interval;
   retrieve, from the data structure, a time associated with a first timestamp stored in a first position within the data structure;
   traverse the data structure until a second timestamp is reached, wherein the second timestamp is a last timestamp within a time slot associated with the first timestamp; and
   generate a first aggregated value based on all the timestamps between the first timestamp and the second timestamp, wherein the aggregated value represents a count of the anomalies detected between the first timestamp and the second timestamp.

19. The non-transitory, computer-readable medium of claim 13, wherein the instructions further cause the one or more processors to:
- receive, from the anomaly detection model and based on the anomaly timeseries dataset, one or more probabilities corresponding to the one or more anomalies detected by the anomaly detection model;
- retrieve an anomaly confidence threshold; and
- remove from the one or more anomalies those anomalies that do not meet the anomaly confidence threshold.

20. The non-transitory, computer-readable medium of claim 13, wherein the instructions that cause the one or more processors to transform the plurality of sets of timestamps into the anomaly timeseries dataset further cause the one or more processors to generate the anomaly timeseries dataset with a plurality of time windows and a corresponding number of anomalies detected during a corresponding time window.

* * * * *